(12) United States Patent
Tsuji

(10) Patent No.: US 8,763,748 B2
(45) Date of Patent: Jul. 1, 2014

(54) WORK VEHICLE

(75) Inventor: Kenichiro Tsuji, Ashiya (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/599,280

(22) Filed: Aug. 30, 2012

(65) Prior Publication Data

US 2013/0228390 A1  Sep. 5, 2013

(30) Foreign Application Priority Data

Sep. 7, 2011 (JP) .................. 2011-195323
Aug. 20, 2012 (JP) .................. 2012-181816

(51) Int. Cl.
*B60K 20/00* (2006.01)
*B60W 10/10* (2012.01)
*B60W 10/18* (2012.01)
*G05G 9/00* (2006.01)

(52) U.S. Cl.
USPC ...... 180/333; 74/473.1; 74/471 XY; 180/336; 192/219.4

(58) Field of Classification Search
USPC ....... 74/411.5, 471 R, 473.1, 473.19–473.21, 74/471 XY; 180/333, 336, 364, 365, 370; 192/215, 218, 219.4
See application file for complete search history.

(56) References Cited

U.S. PATENT DOCUMENTS

| | | | | |
|---|---|---|---|---|
| 1,908,907 A * | 5/1933 | Lessler | .................. | 192/219.4 |
| 3,242,758 A | 3/1966 | Harris et al. | | |
| 3,299,999 A * | 1/1967 | Martin | .................. | 192/219.7 |
| 3,601,231 A * | 8/1971 | Kolacz et al. | .................. | 188/69 |
| 3,710,904 A * | 1/1973 | Boyer et al. | .................. | 192/219.7 |
| 3,780,839 A * | 12/1973 | Schroeder | .................. | 192/220.2 |
| 3,967,709 A * | 7/1976 | Cole et al. | .................. | 192/218 |
| 3,987,879 A * | 10/1976 | Longshore et al. | ........ | 192/219.5 |
| 4,004,665 A * | 1/1977 | Guhl et al. | .................. | 192/219.4 |
| 4,031,977 A * | 6/1977 | Grosseau | .................. | 180/336 |
| 4,054,181 A * | 10/1977 | Grosseau | .................. | 180/336 |
| 4,273,224 A * | 6/1981 | Brown et al. | .................. | 477/95 |
| 4,298,108 A * | 11/1981 | Hutchison | .................. | 192/13 R |
| 4,473,142 A | 9/1984 | Makishima | | |
| 4,667,785 A * | 5/1987 | Toyoda et al. | .............. | 192/13 A |
| 4,709,793 A * | 12/1987 | Sakakibara et al. | ....... | 192/219.4 |
| 4,846,322 A * | 7/1989 | Swank | .................. | 192/219.4 |
| 4,875,563 A * | 10/1989 | Larson et al. | .............. | 192/219.4 |
| 5,064,975 A * | 11/1991 | Boucher | .................. | 200/61.88 |
| 5,086,895 A * | 2/1992 | Nemoto | .................. | 192/219.4 |
| 5,096,032 A * | 3/1992 | Hutchison et al. | ......... | 192/219.4 |
| 5,706,703 A * | 1/1998 | Kim | .................. | 74/473.24 |
| 8,096,921 B2 * | 1/2012 | Hahn | .................. | 477/170 |

FOREIGN PATENT DOCUMENTS

| | | |
|---|---|---|
| FR | 2499731 A1 | 8/1982 |
| JP | 55166723 A | 12/1980 |
| JP | 1178622 A | 3/1999 |
| JP | 2004278560 A | 10/2004 |
| JP | 3979706 B2 | 9/2007 |

* cited by examiner

*Primary Examiner* — Paul N Dickson
*Assistant Examiner* — Laura Freedman
(74) *Attorney, Agent, or Firm* — The Webb Law Firm

(57) ABSTRACT

When an operation lever is operated to either a speed changing path or a neutral path, a second link mechanism establishes no operative coupling between the operation lever and a parking brake mechanism. When the operation lever is operated from the neutral path to a linking path, the second link mechanism establishes operative coupling between the operation lever and the parking brake mechanism. Further, when the operation lever is operated to a braking path, the parking brake mechanism is activated. When the lever is operated to a locking path, a locking mechanism is activated.

10 Claims, 20 Drawing Sheets

WORK VEHICLE

BACKGROUND OF THE INVENTION

1. Field of the Invention

The present invention relates to a work vehicle using a single operation lever for effecting both speed change operations and a parking brake operation.

2. Description of the Related Art

Conventionally, as an example of such work vehicle as described above, there is known e.g. a work vehicle disclosed in Japanese Patent No. 3979706 (paragraphs [0007] through [0019]; paragraphs [0033] through [0038], FIGS. 7 through 17). More particularly, this work vehicle includes a transmission mechanism for transmitting a rotational drive power from an engine to a traveling device, a speed changer device (referred to as a "main speed changer device" in the document) disposed in the transmission mechanism and capable of changing the vehicle speed through speed changing of the rotational drive power, a parking brake device capable of restricting the operation of the transmission mechanism (referred to as a "parking lock device" in the above document), and an operation lever manually pivotably operable and capable of braking the speed changing operations of the speed changer device and the braking operation of the parking brake device.

This tractor includes a single operation shaft coupled to an operation lever so as to act in response to an operation of the operation lever and operably coupling the operation lever, the speed changer device and the parking brake device to each other, and a locking mechanism capable of maintaining the parking brake device under its condition of restricting the operation of the transmission mechanism (in the document, " a lever guide" and "an engaging portion" which is the lower end of the operation lever).

The technique disclosed in Japanese Patent No. 3979706 adopts the arrangement of the single operation shaft operably coupling the operation lever, the speed changer device and the parking brake device to each other, such that with operations of the single operation lever, both the speed changing operations and the parking brake operation are effected.

Further, in the technique disclosed in Japanese Patent No. 3979706, a neutral path is extended beyond the area including speed changing paths and there is provided a brake operation path that extends straight from the terminal end of this neutral path along the direction intersecting this neutral path (the direction parallel with the speed changing paths). In operation, when the operation lever is operated along this brake operation path, the operation member is pivoted, thereby to pivot the parking brake mechanism to effect a parking brake operation.

Further, beyond the terminal end of the brake path, there is provided a locking path for actuating the locking mechanism and there is provided an arrangement that inhibits an operation of the operation lever from the locking path toward the neutral path (braking path), thus preventing the operation lever from being disengaged from the braking path to result in inadvertent release of the parking brake.

SUMMARY OF THE INVENTION

In the case of the above-described tractor disclosed in Japanese Patent No. 3979706, it is necessary to firstly push down the operation lever in order to operate this operation lever from the braking path to a locking path or from the locking path to the braking path. Hence, there exists room for improvement in the operability of the parking brake.

In view of the above, according to the present invention, there is proposed a work vehicle comprising:

an engine;

a transmission mechanism for transmitting a rotational drive power of the engine to a traveling device;

a speed changer device provided in the transmission mechanism and capable of changing the vehicle speed by speed-changing the rotational drive power;

a parking brake mechanism capable of restricting the operation of the transmission mechanism;

a single operation lever that is manually pivotable and capable of speed changing operations of the speed changer device and a braking operation of the parking brake device;

a first link mechanism for linking the operation lever with the speed changer device;

a second link mechanism capable of linking and release of linking between the operation lever and the parking brake mechanism;

a locking mechanism capable of maintaining the parking brake device under a condition of restricting the operation of the operation lever through restriction of the position of the operation lever;

wherein the operation lever includes, as speed changing operation paths thereof, a neutral path corresponding to a neutral state of the speed changer device and a speed changing path extending straight from the neutral path and corresponding to a speed changing state of the speed changer device;

the braking operation is effected only by a pivotal operation of the operation lever;

the operation lever includes, as brake operating paths thereof, a linking path extending from the neutral path along a direction intersecting the speed changing path, a braking path extending from the terminal end of the linking path along a direction intersecting the linking path, and a locking path extending at least form the terminal end of the braking path along a direction intersecting the braking path;

when the operation lever is operated either to the speed changing path or the neutral path, the second link mechanism does not link the operation lever with the parking brake mechanism;

when the operation lever is operated from the neutral path to the linking path, the second link mechanism links the operation lever with the parking brake mechanism;

when the operation lever is operated to the braking path, the parking brake mechanism is actuated; and when the operation lever is operated to the locking path, the locking mechanism is actuated.

With the above-described arrangement, there are provided separately, the first link mechanism for linking the operation lever with the speed changer device and the second link mechanism capable of linking the operation lever with the parking brake mechanism; and in addition, with the ingenious improvement of the operation paths of the operation lever, the speed changing operations and the parking operation are made possible only with a series of pivotal operations of the operation lever. That is, with use of the inventive arrangement above, the operability of the parking brake is much improved.

Incidentally, when the speed changing operations and the parking operation are made possible only with a series of pivotal operations of the operation lever, there arises the possibility of erroneous operation resulting from confusion between the different operations. However, with the above-described characterizing feature of the present invention, the second link mechanism is capable of establishing linkage and release of linkage between the operation lever and the parking brake mechanism, so that when the operation lever is operated to either the speed changing path or the neutral path, linkage is not established between the operation lever and the parking brake mechanism. The linkage between the operation lever and the parking brake mechanism is established only when the operation lever is operated from the neutral path to the linking path. Therefore, even with use of the arrangement that the speed changing operations and the parking operation are made possible only with a series of pivotal operations of the operation lever, there is no possibility of erroneous operation between these operations.

Preferably, in the above-described arrangement, the locking mechanism includes a retaining portion connected to a component included in the operation lever and a retained portion fixed to a component which remains stationary relative to the operation lever; and when the operation lever is operated to the locking path, the retaining portion is retained to the retained portion.

In the above-described arrangement, a retaining portion (or a retained portion) constituting the locking mechanism is provided in a component included in the operation lever. This arrangement provides direct operative linkage between the operations of the operation lever and the actuation of the locking mechanism, so that erroneous actuation of the locking mechanism will hardly occur.

In the above-described arrangement, preferably, the locking path includes a first locking path extending from the terminal end of the braking path along the direction intersecting the braking path and extending toward the neutral path and a second locking path extending from the terminal end of the first locking path along the direction intersecting the first locking path and extending toward the neutral path.

With the above-described arrangement, for returning the operation lever from the second locking path to the neutral path, it is necessary to operate the lever first in the direction away from the neutral path and then operate it, with a change of direction, along the first locking path away from the neutral path and then, operate it, with another change of direction, along the braking path In this way, for releasing the restraint by the locking mechanism, this requires at least two changes of paths, so inadvertent release of the parking brake will hardly occur.

In the above-described arrangement, preferably, the locking mechanism includes a retaining portion connected to a component included in the operation lever and a retained portion fixed to a component which is stationary relative to the operation lever;

when the operation lever is operated into the locking path, the retaining portion becomes retained to the retained portion; and the retained portion includes a first opening portion which the retaining portion can enter and a projecting portion adjacent the first opening, and the retaining portion includes a second opening portion which the projecting portion can enter; and when the operation lever is operated to the speed changing path or the neutral path, the retaining portion and the retained portion are separated from each other;

when the operation lever is operated from the neutral path to the terminal end of the linking path, the retaining portion and the retained portion move closer to each other;

when the operation lever is operated from the terminal end of the linking path to the terminal end of the braking path, the retaining portion enters the first opening portion and the second opening portion is brought into opposition to the projecting portion;

when the operation lever is operated from terminal end of the braking path to the terminal end of the first locking path, the projecting portion enters the second opening portion; and when the operation lever is operated from the terminal end of the first locking path to the terminal end of the second locking path, the projecting portion is retained to the edge of the second opening portion.

With the above-described arrangement, the process from engagement of the parking brake to completion of the locking of this state requires entrance of the retaining portion into the first opening portion on the side of the retained portion, subsequent entrance of the projecting portion on the retained portion side into the second opening portion on the retaining portion side and subsequent retention between the projecting portion and the edge of the second opening portion. That is, rather than simple retention of one of the retaining portion and the retained portion to the other, the retention involves mutual complex engagement relationship between the retaining portion and the retained portion. Therefore, inadvertent release of the locking by the locking mechanism will hardly occur.

In the above-described arrangement, preferably, the first link mechanism includes a movable shaft supported to be movable to a plurality of speed positions, a first motion converting mechanism for converting a pivotal operation of the operation lever along the vehicle right/left direction into a motion of the movable shaft along a first direction, and a second motion converting mechanism for converting a pivotal operation of the operation lever along the vehicle body fore/aft direction into a motion of the movable shaft along a second direction;

the first motion converting mechanism includes a first position adjusting member capable of adjusting the relative position between the operation lever and the movable shaft in the vehicle body fore/aft direction; and the second motion converting mechanism includes a second position adjusting member capable of adjusting the relative position between the operation lever and the movable shaft in the vehicle body right/left direction.

With the above-described characterizing arrangement, pivotal operations of the operation lever are converted into the motions of the movable shaft in the first direction and the second direction by the first motion converting mechanism and the second motion converting mechanism, so that with movements of the movable shaft to a plurality of speed positions, the speed changing operations of the speed changer device are possible. In this, as to the disposing position of the operation lever, it is required for this to be movable along the speed changing path. Further, as to the disposing position of the movable shaft too, it is required to support the shaft to the cover member or the like to be movable to the plurality of speed positions. Therefore, in order to meet these requirements, it is necessary for the first link mechanism to covert the movement of the operation lever into a motion of the movable shaft, with retaining the ability of adjusting the relative position between the operation lever and the movable shaft. Then, in the characterizing arrangement, the first motion converting mechanism includes a first position adjusting member and the second motion converting mechanism includes a second position adjusting member. With this, by the first position adjusting member, the relative position between the operation lever and the movable shaft along the vehicle body fore/aft direction can be adjusted. And, by the second position adjusting member, the relative position between the operation lever and the movable shaft along the vehicle body right/left direction can be adjusted. The provisions of the first motion converting mechanism and the second motion converting mechanism between the operation lever and the movable shaft, rather than direct coupling between the operation lever and the movable shaft, it is possible to restrict transmission of vibration to the operation lever from the movable shaft supported to e.g. a cover member.

In the above-described arrangement, preferably, one of the first motion converting mechanism and the second motion converting mechanism includes a coupling mechanism for coupling to the movable shaft; and the coupling mechanism allows the motion of the movable shaft converted by the other one of the first motion converting mechanism and the second motion converting mechanism.

The above arrangement will be explained below, taking for an example, the case of one of the first motion converting mechanism and the second motion converting mechanism is provided as the second motion converting mechanism and the other one of the first motion converting mechanism and the second motion converting mechanism is provided as the first motion converting mechanism and the coupling mechanism is provided in the second motion converting mechanism. In this case, when the operation lever is pivotally operated about an axis along the vehicle body fore/aft direction, via the coupling mechanism provided in the second motion converting mechanism, the motion of the operation lever is transmitted to the movable shaft, so that the movable shaft can be moved in the second direction. On the other hand, when the operation lever is pivotally operated about an axis along the vehicle body right/left direction, the motion of the operation lever is converted by the first motion converting mechanism into a motion of the movable shaft in the first direction. In this, as the coupling mechanism allows the motion of the movable shaft in this first direction, the motion of the movable shaft converted by the first motion converting mechanism is not hindered, so that the movement of the movable shaft to the plurality of speed positions can be effected appropriately.

In the above-described arrangement, preferably, the coupling mechanism includes a coupling pin member and a coupling member; and the coupling member includes a pair of wall portions extending in the first direction and the second direction and spaced apart from each other and the coupling member is coupled to the coupling pin member with the coupling pin member being disposed between the pair of wall portions.

With the above-described characterizing arrangement, the coupling mechanism can be constituted simply of a coupling pin member and a coupling member having a pair of wall portions. Hence, the construction of the coupling mechanism can be simple.

Preferably, in the above-described arrangement, there are provided a projecting portion disposed in one of a component included in the operation lever and a component included in the second link mechanism and a hole portion disposed in the other of the component included in the operation lever and the component included in the second link mechanism, the projecting portion being capable of entering the hole portion; and when the projecting portion enters the hole portion, the operation lever and the parking brake mechanism are linked to each other via the second link mechanism.

With the above-described arrangement, the linking and release of linking between the operation lever and the parking brake mechanism by the second link mechanism is constituted from the simple arrangement of a projecting portion and a hole portion provided in a component included in the operation lever and a component included in the second link mechanism. Therefore, the number of the components can be small and the number of troubles can be small also. Moreover, for actuation of the parking brake mechanism, this requires entrance of the projecting portion into the hole portion. Hence, inadvertent activation of the parking brake mechanism will not occur.

In the above-described arrangement, preferably, the projecting portion projects in the direction along the linking path; and the length of the projecting portion is shorter than the amount of movement of the hole portion when the operation lever is operated along the linking path and the length is longer than the amount of movement of the hole portion in the direction along the linking path when the operation lever is operated along the braking path and the locking path.

With the above-described arrangement, the length of the projecting portion is shorter than the amount of movement of the hole portion when the operation lever is operated along the linking path. Hence, when the operation lever is returned to the neutral path from the linking path, the projecting portion will move out of the hole portion in a reliable manner. Therefore, the parking brake mechanism will not be operated inadvertently when the operation lever is located in the speed changing path and the neutral path.

Further, since the length of the projecting portion is longer than the amount of movement of the hole portion in the direction along the linking path when the operation lever is operated along the braking path and the locking path. Hence, in the course of the operation along the braking path and the locking path, the projecting portion will not move out of the hole portion. Namely, there occurs no inadvertent release of the linkage by the second link mechanism in the course of a parking brake operation. Hence, reliability and stability of the parking brake operation are improved.

Preferably, the locking mechanism includes a retaining portion connected to a component included in the operation lever and a retained portion fixed to a component which remains stationary relative to the operation lever;

when the operation lever is operated to the locking path, the retaining portion is retained to the retained portion; and the retained portion and one of the projecting portion and the hole portion are supported to a bracket that pivotally supports the operation lever.

In the above-described arrangement, since the retained portion and one of the projecting portion and the hole portion are supported to a bracket that pivotally supports the operation lever, it is possible to reduce the number of components. Moreover, since the bracket which supports the operation lever which is frequently used is comprised of a component having a certain degree of strength, the retained portion or the like can be supported in a stable manner.

DETAILED DESCRIPTION OF THE PREFERRED EMBODIMENTS

Next, embodiments in which the present invention is applied to a tractor will be explained with reference to the accompanying drawings.

[General Construction of Tractor]

Figure 1:
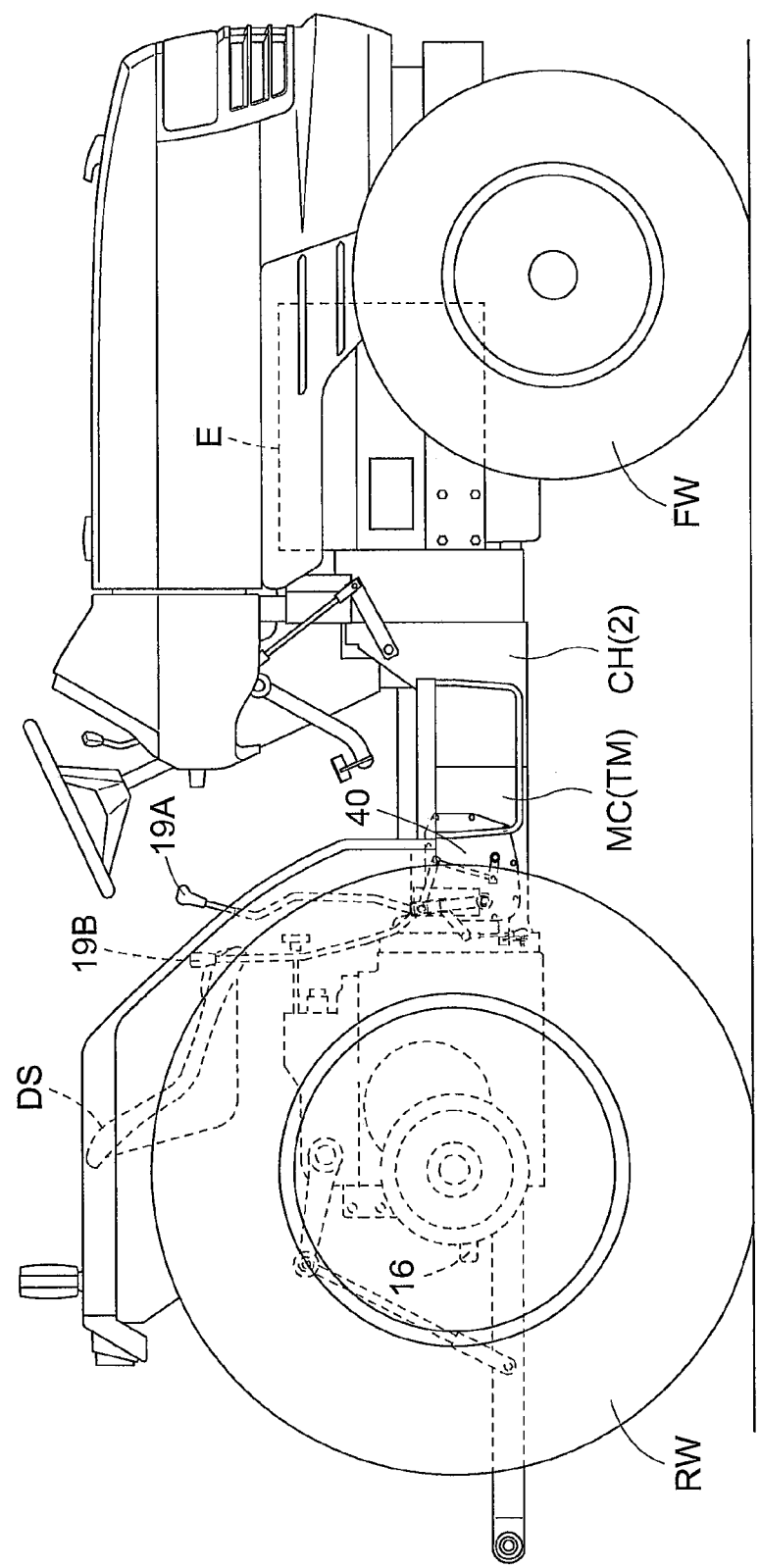
FIG. 1 is a right side view of a tractor relating to the present invention.

The tractor, as shown in FIG. 1, includes an engine E, a clutch housing CH, and a transmission case MC. The engine E and the transmission case MC are connected one after another in the fore/aft direction via the clutch housing CH. And, the vehicle body is supported on front wheels FW and rear wheels RW as "traveling devices". Inside the clutch housing CH, there is disposed a main clutch 2 to be detailed later. Inside the transmission case MC, there is disposed a transmission mechanism TM to be detailed later.

At the rear section of the vehicle body, there is provided a driving section, in which a driver's seat DS is provided. On the right side of the driver's seat DS, there are provided, as "operation lever" to be detailed later, a main speed changer lever 19A and an auxiliary speed changer lever 19B, which are pivotably operated in the fore/aft direction and right/left direction along a lever guide provided in the driving section as will be described later. With operations of the main speed changer lever 19A, speed changing operations of a main speed changer device 6 (see FIG. 2) as a "speed changer device" and a parking brake operation of a parking brake mechanism 17 to be described later (see FIGS. 2 and 5) are effected. With operations of the auxiliary speed changer lever 19B, auxiliary speed changing operations of an auxiliary speed changer device 8 are effected.

[Main Clutch]

Figure 2:
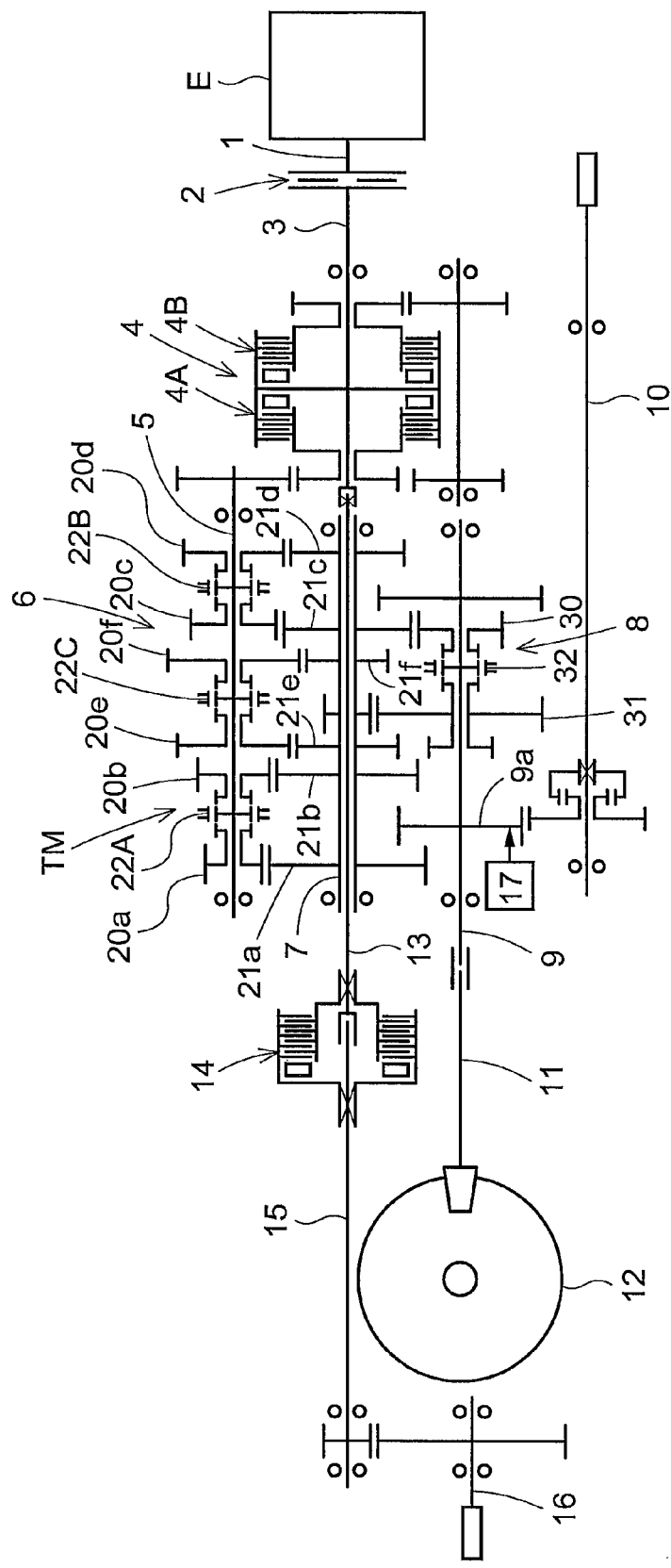
FIG. 2 is a view showing a gear train of a transmission mechanism relating to the present invention.

A main clutch 2, as shown in FIG. 2, is connected to a crank shaft 1 of the engine E and can be switched over between an "engaged stage" and a "disengaged state". When the main clutch 2 is under the "engaged state", the rotational drive power (to be referred to as "power" hereinafter) of the engine E is transmitted to the transmission mechanism TM. When the main clutch 2 is under the "disengaged state", the power is not transmitted to the transmission mechanism TM.

[Transmission Mechanism]

Figure 3:
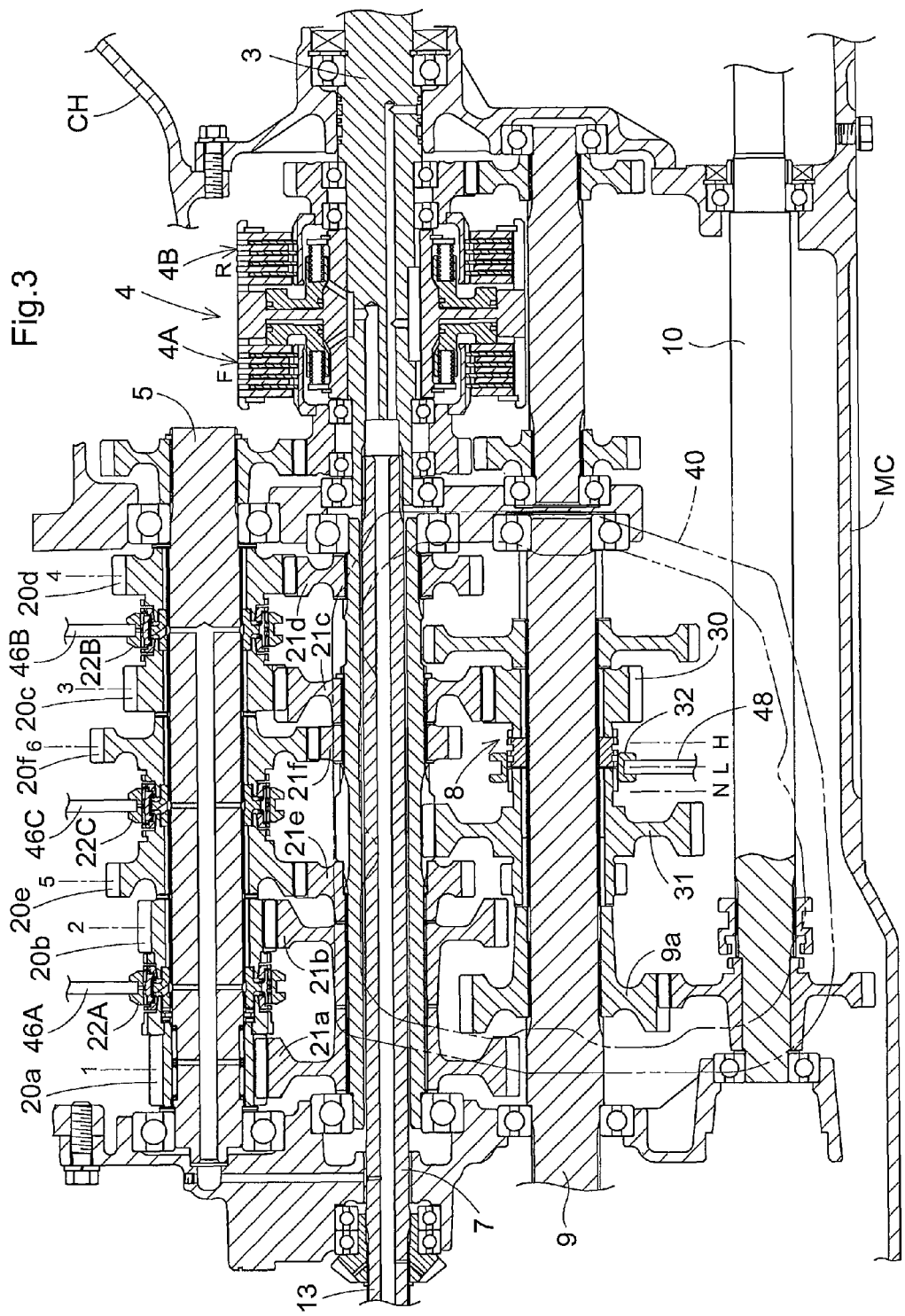
FIG. 3 is a right side view in vertical section showing the transmission mechanism.

The transmission mechanism TM, as shown in FIG. 2 and FIG. 3, is connected to the engine E via the main clutch 2. During traveling, the power of the engine E can be transmitted to the front wheels FW and the rear wheels RW or to the rear wheels RW alone. The transmission mechanism TM includes a propelling shaft 3 disposed along the fore/aft direction of the vehicle body to be coaxial with the crank shaft 1, an input shaft 5 disposed rearwardly and upwardly of the propelling shaft 3 and parallel with this propelling shaft 3, a tubular counter shaft 7 disposed rearwardly of and coaxially with the propelling shaft 3 and parallel with the input shaft 5, an output shaft 9 disposed parallel with the counter shaft 7, a front wheel propelling shaft 10 disposed parallel with the output shaft 9, and a rear wheel propelling shaft 11 connected directly to the rear portion of the output shaft 9. Incidentally, all these shafts are arranged along the vehicle body fore/aft direction and rotatably supported to the transmission case MC, etc.

The power is transmitted from the crank shaft 1 via the main clutch 2 to the propelling shaft 3. This power is further transmitted by a forward/reverse switchover mechanism 4 provided around the propelling shaft 3 to be used as a forward traveling power (forward rotation) or converted into a reverse traveling power (reverse rotation). The forward/reverse switchover mechanism 4 includes a forward traveling clutch 4A and a reverse traveling clutch 4B. When the forward traveling clutch 4A is under the "engaged state" and the reverse traveling clutch 4B is under the "disengaged state", the power is transmitted directly as the forward rotation from the propelling shaft 3 to the input shaft 5. When the forward traveling clutch 4A is under the "disengaged state" and the reverse traveling clutch 4B is under the "engaged state", the power is converted into the reverse rotation and transmitted as such to the input shaft 5.

The power transmitted to the input shaft 5 is speed-changed to any one of from the first through sixth speed of six speeds and transmitted as such to the counter shaft 7. The main speed changer device 6 will be detailed later. The power transmitted to the counter shaft 7 is further speed-changed to either the high speed or the low speed by the auxiliary speed changer device 8 and transmitted as such to the output shaft 9. The power transmitted to the output shaft 9 is transmitted via an output gear 9a splined on this output shaft 9 to the front wheel propelling shaft 10. The power transmitted to the rear wheel propelling shaft 11 is transmitted via a rear wheel differential device 12 to the rear wheel RW. The power transmitted to the front wheel propelling shaft 10 via an unillustrated front wheel differential device to the front wheels FW.

Further, the transmission mechanism TM includes a PTO transmission line that takes off a portion of the power and transmits it to an implement (or "attachment"). The transmission mechanism TM, as shown in FIG. 2 and FIG. 3, includes a PTO drive shaft 13 connected coaxially to the rear end of the propelling shaft 3, a PTO clutch 14 connected to a rear end of the PTO drive shaft 13, a PTO transmission shaft 15 connected to a rear portion of the PTO clutch 14 and disposed coaxially with the PTO drive shaft 13, and a PTO output shaft 16 disposed rearwardly and upwardly of the PTO transmission shaft 15 and parallel with this PTO transmission shaft 15. Incidentally, the PTO drive shaft 13 is inserted in the tubular counter shaft 7.

When the main clutch 2 is under the engaged state, the power transmitted to the propelling shaft 3 is transmitted directly to the PTO drive shaft 13, irrespectively of a movement of the forward/reverse switchover mechanism 4.

The power transmitted to the PTO drive shaft 13 is transmitted to the PTO transmission shaft 15 when the PTO clutch 14 is under the engaged state and transmitted further to the PTO output shaft 16. When the PTO clutch 14 is under the disengaged state, the power transmitted to the PTO drive shaft 13 is not transmitted to the PTO transmission shaft 15. Incidentally, the PTO clutch 14 can be switched over between the engaged state and the disengaged state by an unillustrated PTO clutch 14 lever.

[Main Speed Changer Device]

The main speed changer device 6, as shown in FIG. 2 and FIG. 3, is disposed between the input shaft 5 and the counter shaft 7. The main speed changer device 6 includes a first first-speed gear 20a through a first sixth-speed gear 20f rotatably mounted on the input shaft 5. From the vehicle body front side (the right side in FIG. 2 and FIG. 3), there are arranged the first fourth-speed gear 20d, the first third-speed gear 20c, the first sixth-speed gear 20f, the first fifth-speed gear 20e, the first second-speed gear 20b and the first first-speed gear 20a. Further, around the input shaft 5, between the first fourth-speed gear 20d and the first third-speed gear 20c, a second shifter 22B is disposed. Between the first sixth-speed gear 20f and the first fifth-speed gear 20e, a third shifter 22C is disposed. Between the first second-speed gear 20b and the first first-speed gear 20a, a first shifter 22A is disposed.

The second shifter 22B is slid along the axial direction of the input shaft 5 by a movement of the second shift fork 46B (see FIG. 3 and FIG. 6) in response to a speed changing operation of the main speed changer lever 19A, thereby to selectively connect the input shaft 5 with one of the first fourth-speed gear 20d and the first third-speed gear 20c or connect it to neither of the gears. That is, of the first fourth-speed gear 20d and the first third-speed gear 20c, only the gear connected to the input shaft 5 will be rotated by the power.

The third shifter 22C is slid along the axial direction of the input shaft 5 by a movement of the third shift fork 46C (see FIG. 3 and FIG. 6) in response to a speed changing operation of the main speed changer lever 19A, thereby to selectively connect the input shaft 5 with one of the first sixth-speed gear 20f and the first fifth-speed gear 20e or connect it to neither of the gears. That is, of the first sixth-speed gear 20f and the first fifth-speed gear 20e, only the gear connected to the input shaft 5 will be rotated by the power.

The first shifter 22A is slid along the axial direction of the input shaft 5 by a movement of the first shift fork 46A (see FIG. 3 and FIG. 6) in response to a speed changing operation of the main speed changer lever 19A, thereby to selectively connect the input shaft 5 with one of the first second-speed gear 20b and the first first-speed gear 20a or connect it to neither of the gears. That is, of the first second-speed gear 20b and the first first-speed gear 20a, only the gear connected to the input shaft 5 will be rotated by the power.

Though will be described later, the first shift fork 34A through third shift fork 46C are configured such that only one of them is operated in response to a speed changing operation of the main speed changer lever 19A. When one shifter connects the input shaft 5 with one gear, the other shifters establish no connection between the input shaft 5 with any gear. With this, the power of the input shaft 5 is transmitted to only one of the first-speed gear 20a through sixth-speed gear 20f ("speed changing state" relating to the present invention). Also, when none of the shifters establish connection between the input shaft 5 with any gears, the power of the input shaft 5 is not transmitted to any gear ("neutral state" relating to the present invention).

Further, the main speed changer device 6, as shown in FIG. 2 and FIG. 3, includes second first-speed gear 21a through second sixth-speed gear 21f splined on the counter shaft 7 to be rotatable in unison with this counter shaft 7. From the vehicle body front side, there are disposed the second fourth-speed gear 21d, the second third-speed gear 21c, the second sixth-speed gear 21f, the second fifth-speed gear 21e, the second second-speed gear 21b and the second first-speed gear 21a in this mentioned order. The second fourth-speed gear 21d is constantly meshed with the first fourth-speed gear 21c. The second third-speed gear 21c is constantly meshed with the first third-speed gear 20c. The second sixth-speed gear 21f is constantly meshed with the first sixth-speed gear 20f. The second fifth-speed gear 21e is constantly meshed with the first fifth-speed gear 20e. The second second-speed gear 21b is constantly meshed with the first second-speed gear 20b. The second first-speed gear 21a is constantly meshed with the first first-speed gear 20a.

With the above-described arrangements, the power transmitted to the input shaft 5 is speed-changed between the first first-speed gear 20a and the second first-speed gear 21a and transmitted as such to the counter shaft 7 ("first speed" speed changing state) or speed-changed between the first second-speed gear 20b and the second second-speed gear 21b and transmitted as such to the counter shaft 7 ("second speed" speed changing state) or speed-changed between the first third-speed gear 20c and the second third-speed gear 21c and transmitted as such to the counter shaft 7 ("third speed" speed changing state) or speed-changed between the first fourth-speed gear 20d and the second fourth-speed gear 21d and transmitted as such to the counter shaft 7 ("fourth speed" speed changing state) or speed-changed between the first fifth-speed gear 20e and the second fifth-speed gear 21e and transmitted as such to the counter shaft 7 ("fifth speed" speed changing state) or speed-changed between the first sixth-speed gear 20f and the second sixth-speed gear 21f and transmitted as such to the counter shaft 7 ("sixth speed" speed changing state) or not transmitted to the counter shaft 7 at all ("neutral state) relating to the present invention described above).

[Auxiliary Speed Changer Device]

The auxiliary speed changer device 8, as shown in FIG. 2 and FIG. 3, is disposed between the counter shaft 7 and the output shaft 9. The auxiliary speed changer device 8 includes a small diameter high speed gear 30 gear-coupled to the counter shaft 7 and rotatable in synchronism with this counter shaft 7 and a large diameter low speed gear 31 directly engaged with the counter shaft 7 and rotatable in synchronism with this counter shaft 7, in this mentioned order. Further, about the output shaft 9, between the high speed gear 30 and the low speed gear 31, there is provided an auxiliary speed changing shifter 32. The auxiliary speed changing shifter 32 is slid along the axial direction of the output shaft 9 by a movement of an auxiliary speed changing fork 48 (see FIG. 3, FIG. 5 and FIG. 6) in response to an auxiliary speed changing operation of the auxiliary speed changer lever 19B, thereby to selectively connect one of the high speed gear 30 and the low speed gear 31 to the output shaft 9 or connect neither gear to the output shaft 9.

With the above-described arrangements of the auxiliary speed changer device 8, when the output shaft 9 is connected with the high speed gear 30, the power transmitted to the counter shaft 7 is speed-changed to the high speed and transmitted as such to the output shaft 9 (so-called "high speed state"). When the output shaft 9 is connected with the low speed gear 31, the power transmitted to the counter shaft 7 is speed-changed to the low speed and transmitted as such to the output shaft 9 (so-called "low speed state"). When the output shaft 9 is connected with neither gear, the power is not transmitted to the output shaft 9 at all (so-called "neutral state").

[Cover Member]

As shown in FIGS. 3 through 6, the right lateral face of the transmission case MC is configured as a detachable cover 40. With detachment of the cover member 40, the area indicated by the two-dot chain line in FIG. 3 (the area adjacent the lower portion of the transmission case MC about the auxiliary speed changing mechanism) will be opened. This arrangement facilitates maintenance, etc. of the transmission mechanism TM.

[Construction of Main Speed Changer Lever and Operation Paths]

Figure 12:
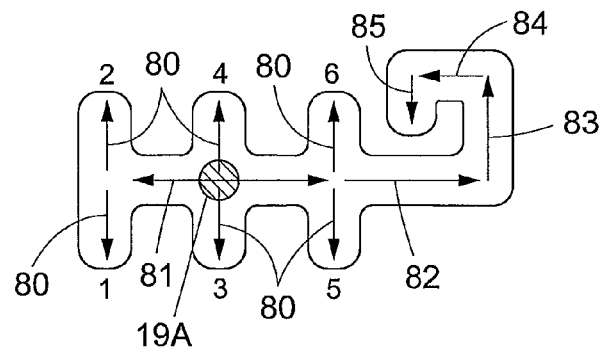
FIG. 12 is a view showing operation paths (lever guide) of the main speed changer lever.

The main speed changer lever 19A, as shown in FIG. 12, is operable along operation paths of a lever guide indicated by arrows. The operation paths of the main speed changer lever 19A can be divided into two roughly, between speed changing operation paths for effecting speed changing operations of the main speed changer device 6 and brake operating paths for effecting braking operations of a parking brake mechanism 17.

The speed changing operation paths includes a neutral path 81 corresponding to the "neutral state" of the main speed changer device 6 and extending linearly along the vehicle body right/left direction and speed changing paths extending linearly along the direction perpendicular to the neutral path 81 (the vehicle body fore/aft direction) and corresponding to the respective "speed changing states" of the main speed changer device 6 ("first speed" through "sixth speed").

The brake operating paths include a linking path 82 on an extension line from the neutral path 81 along a direction perpendicular to the speed changing paths 80 (vehicle body right/left direction), a braking path 83 extending from the terminal end of the linking path 82 along a direction perpendicular to the linking path 82, and a locking path (84, 85) extending at least from the terminal end of the braking path 83 along the perpendicular to the braking path 83 (vehicle right/left direction).

The locking path (84, 85) includes a first locking path 84 extending from the terminal end of the braking path 83 perpendicular to the braking path 83 (the vehicle body right/left direction) toward the side of the neutral path 81 (the vehicle body left side) and a second locking path 85 extending from the terminal end of the first locking path 84 perpendicular to the first locking path 84 and extending toward the side of the neutral path 81 (the vehicle body rear side).

Figure 4:
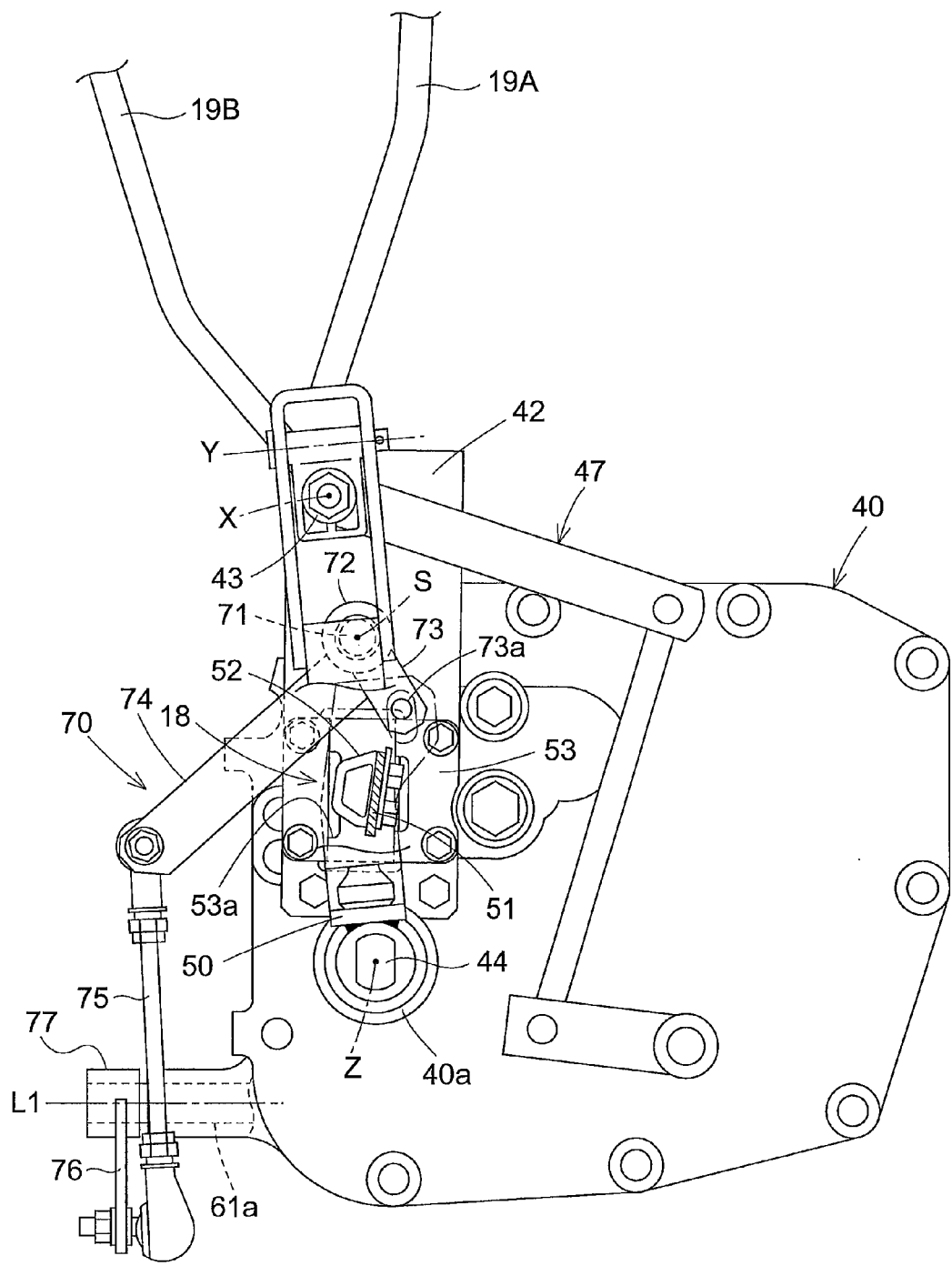
FIG. 4 is a right side view showing a main speed changer lever, a cover member, etc.
Figure 5:
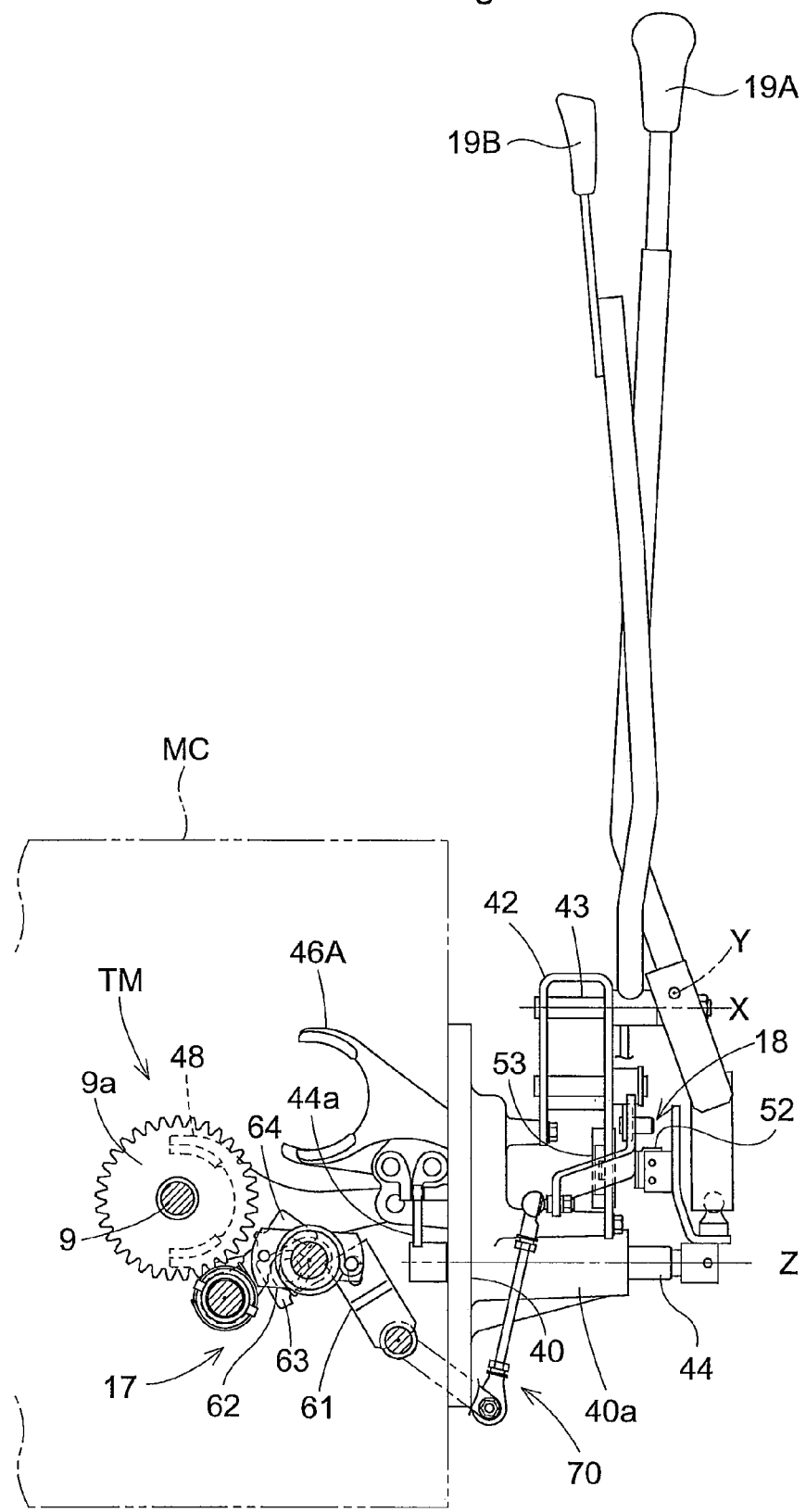
FIG. 5 is a rear view showing the main speed changer lever, the cover member, etc.
Figure 6:
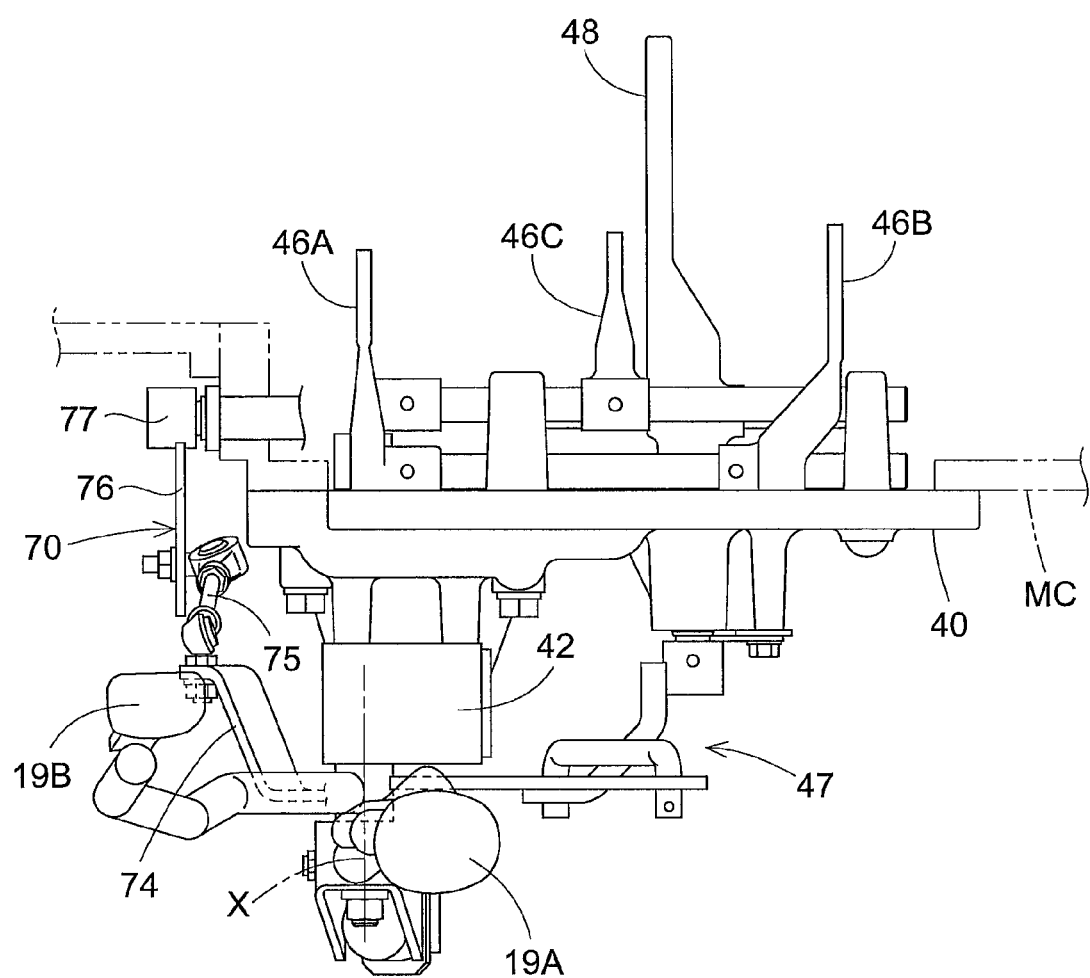
FIG. 6 is a top view showing the main speed changer lever, the cover member, etc.

Next, the specific construction of the main speed changer lever 19A will be explained. The main speed changer lever 19A, as shown in FIGS. 4 through 6, has a portion thereof slightly upwardly of its lower end supported via a bracket 42 to the outer side of the cover member 40. The bracket 42 is formed by bending a relatively thick plate into a U-shaped cross section. The bracket 42 is strongly fixed to the cover member 40 at the lower portion of the face of the vehicle body right/left inner side and the lower portion on the vehicle body right/left outer side with bolts.

Figure 14:
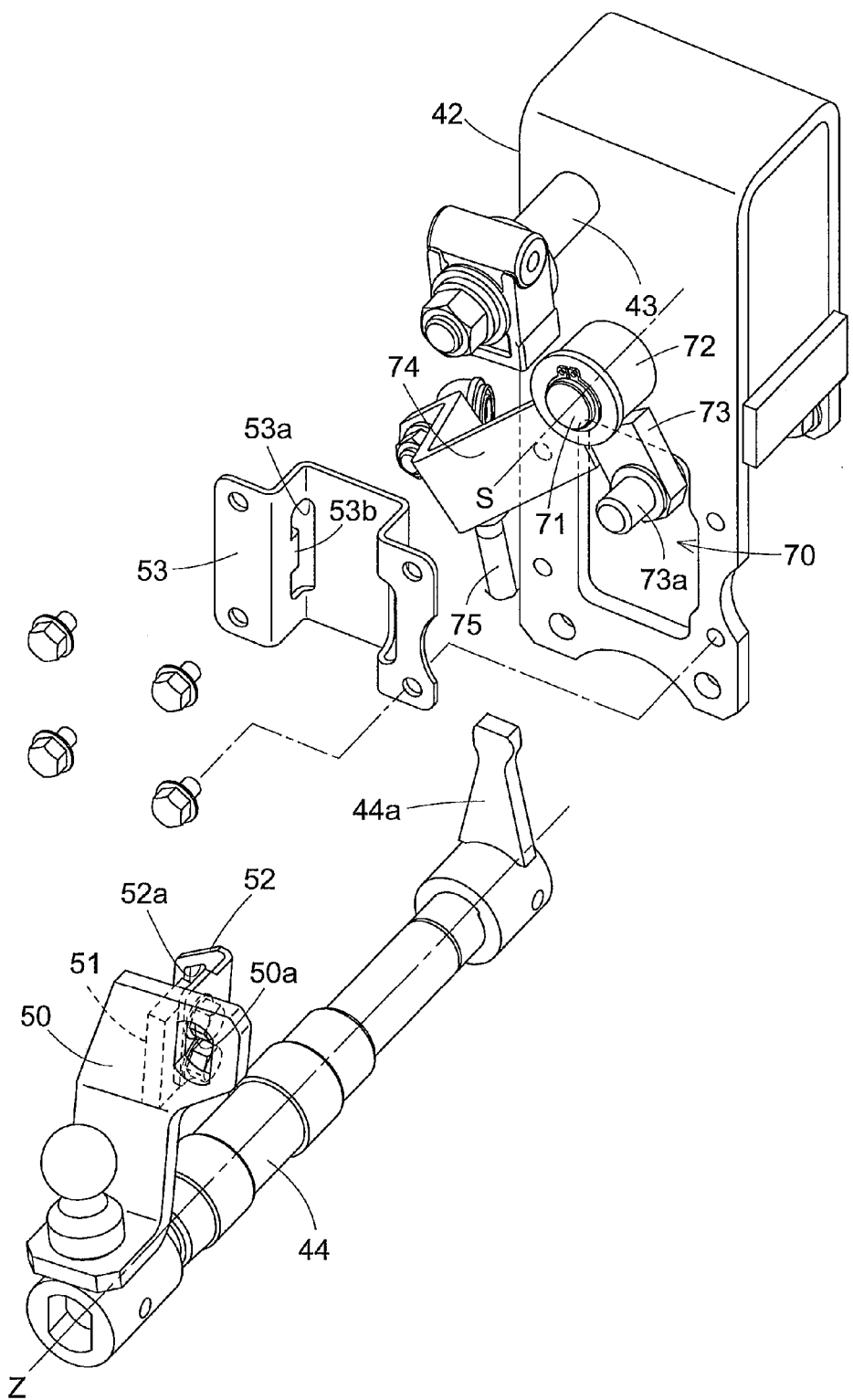
FIG. 14 is an exploded perspective view showing periphery of a bracket.

Between the vehicle body right/left inner and outer faces of the bracket 42, there is fixed a support shaft 43 oriented along the vehicle body right/left direction (see FIG. 14). The vehicle body outer side terminal end of the support shaft 43 projects along the vehicle body outer side direction beyond the outer face of the bracket 42. To the leading end portion of the support shaft 43, there is supported the main speed changer lever 19A which is pivotable about the axis X of the support shaft 43 (the vehicle body fore/aft direction) and pivotable also about an axis Y perpendicular to the axis X (vehicle body right/left direction).

When the main speed changer lever 19A is operated along the neutral path 81, the linking path 82 or the first locking path 84 (see FIG. 12), the main speed changer lever 19A is pivoted about the axis Y (vehicle body right/left direction). Further, when the main speed changer lever 19A is operated along the speed changing paths 80 or the braking path 83 or the second locking path 85 (see FIG. 12), the main speed changer lever 19A is pivoted about the axis X (the vehicle body fore/aft direction).

[Operation Shaft]

Figure 11:
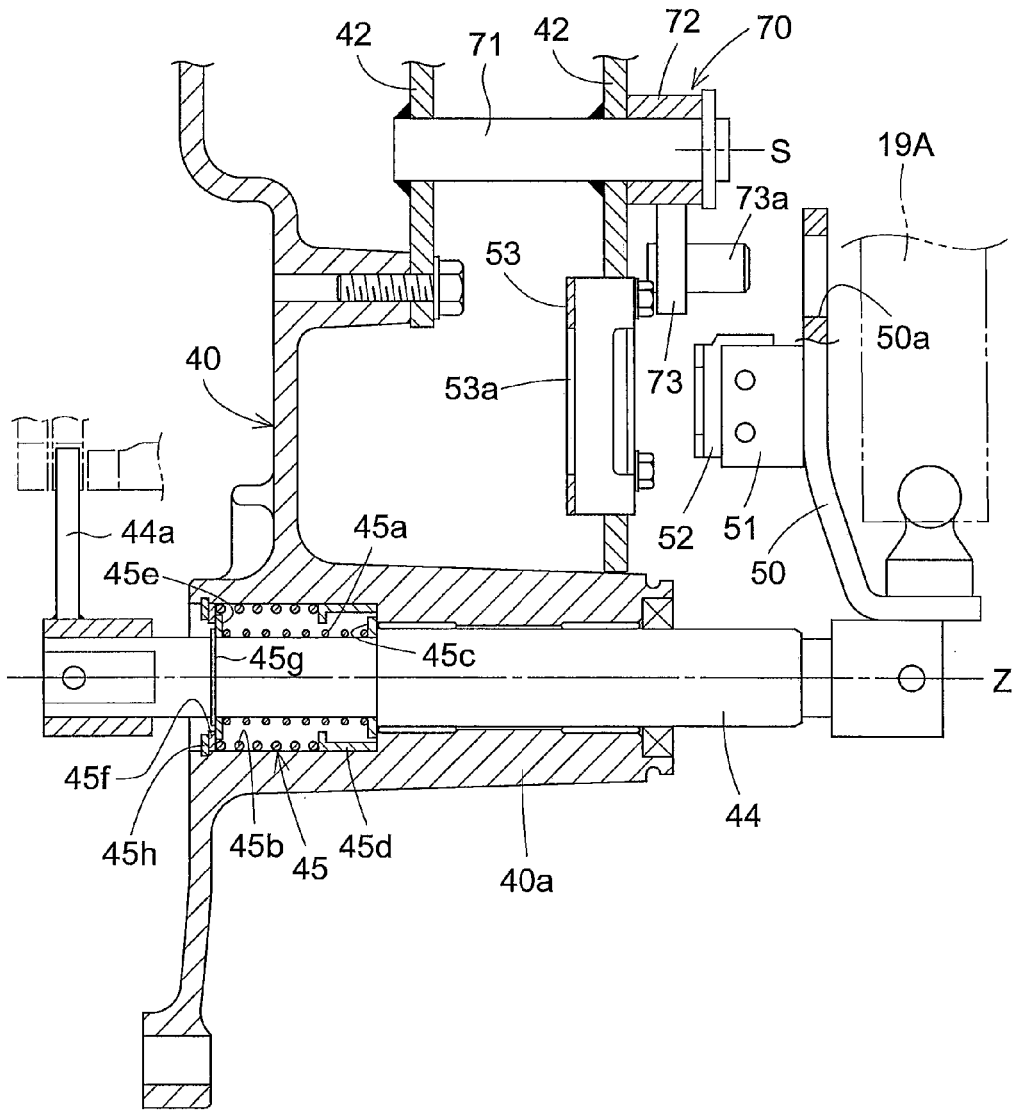
FIG. 11 is a rear view in vertical section showing the cover member, etc. at the position of an operation shaft.

As shown in FIG. 11, to the lower end of the main speed changer lever 19A, there is connected, via a universal joint, an operation shaft 44 as a "first link mechanism". This operation shaft 44 is a bar member having a circular cross section. The universal joint consists of a cylindrical hole portion provided at the lower end of the main speed changer lever 19A along the longitudinal direction of the main speed changer lever 19A and a ball-like portion provided on the top face at the outer end of the operation shaft 44. The ball-like portion is inserted into the hole portion with a small gap relative thereto, so that the ball-like portion is rotatable and slidable relative to the hole portion.

The cover member 40 forms a boss portion 40a having a circular cross section and extending along the vehicle body right/left direction, and the operation shaft 44 is inserted in this boss portion 40a, with the operation shaft 40a being slidable and pivotable between the outer and inner sides of the transmission case MC. Further, between the boss portion 40a and the operation shaft 44, there is provided an urging mechanism 45 to be described later. With the urging force of this urging mechanism 45, the main speed changer lever 19A is urged toward the center side of the neutral path 81, that is, toward the position which forms the starting end of the "third-speed" speed changing path 80 and forms also the staring end of the "fourth-speed" speed changing path 80 (see FIG. 12).

When the main speed changer lever 19A is operated along the neutral path 81, the linking path 82 or the first locking path 84, the operation shaft 44 is slid along an axis Z located downwardly of the axis X and oriented along the vehicle body right/left direction. More particularly, when the main speed changer lever 19A is pivoted in the right direction, the operation shaft 44 is slid toward the inner side of the transmission case MC. When the main speed changer lever 19A is pivoted in the left direction, the operation lever 44 is slid toward the outer side of the transmission case MC. Further, when the main speed changer lever 19a is operated along the speed changing paths 80, the braking path 83 or the second locking path 85, the operation shaft 44 is pivoted about the axis Z. That is, when the main speed changer lever 19A is pivoted in the forward direction, the operation shaft 44 is pivoted in the rearward direction. When the main speed changer lever 19A is pivoted in the rearward direction, the operation shaft 44 is pivoted in the forward direction.

Figure 9:
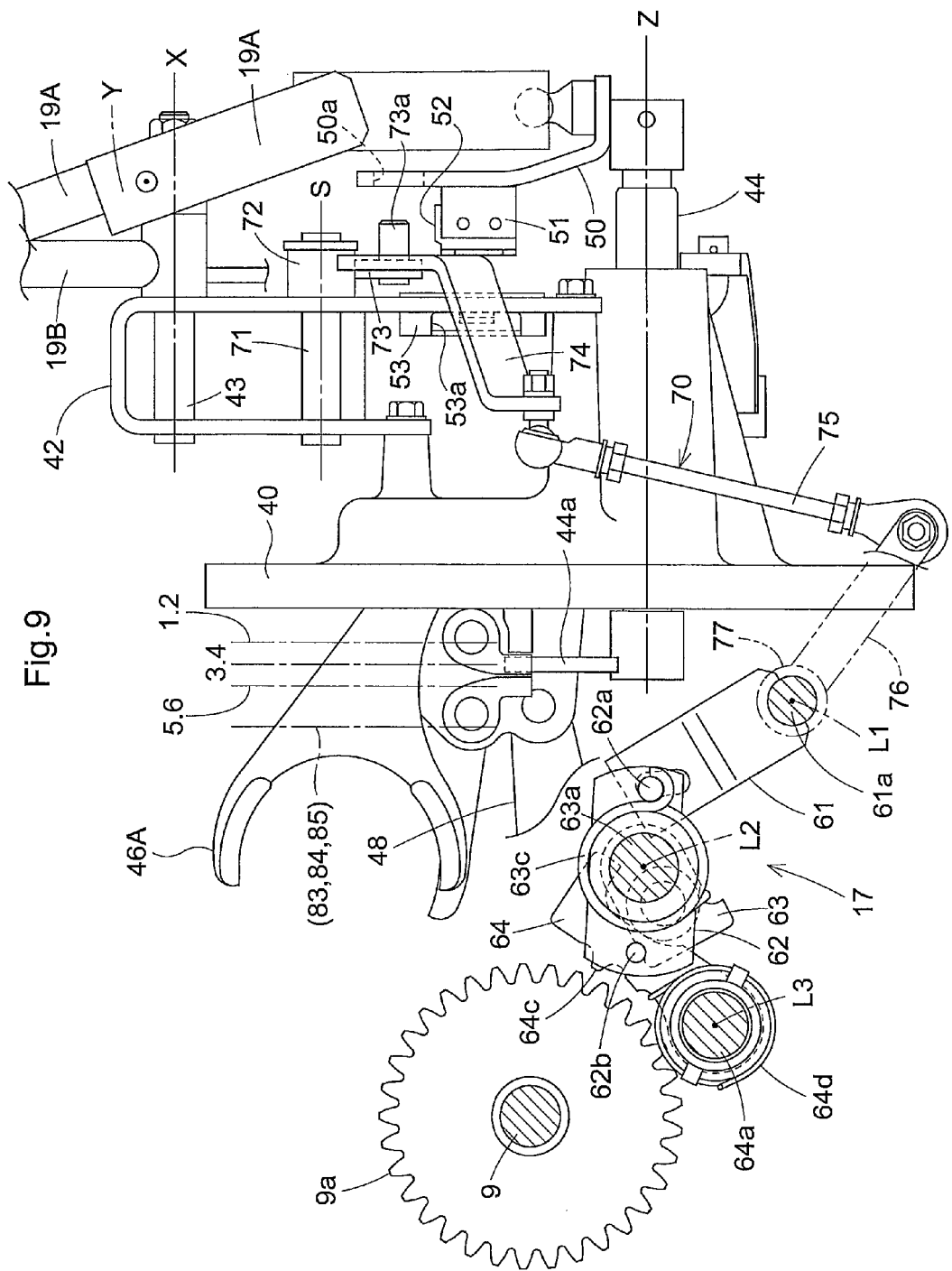
FIG. 9 is a rear view showing the parking brake mechanism under a released state.

Further, as shown in FIG. 11 and FIG. 14, at the terminal end of the operation shaft 44 on the inner side of the transmission case MC, at the top portion thereof toward the upper side, a shift portion 44a is formed as a projection. As shown in FIG. 6 and FIG. 9, to the inner face of the cover member 40, there are respectively supported first shift fork 46A through third shift fork 46C to be slidable along the vehicle body fore/aft direction (that is, the axial direction of the output shaft 9). When the first shift fork 46A is located at an intermediate portion in its slidable range, the first shifter 22A does not connect the input shaft 5 to either one of the first second-speed gear 20b and the first first-speed gear 20a. The same applies to the second shift fork 46B and the third shift fork 46C.

In response to a sliding movement of the operation shaft 44, the shift portion 44a, as shown in FIG. 6, is position-changed to a position engaged with the operation line of the first shift fork 46A or a position engaged with the operation line of the second shift fork 46B or to a position engaged with the operation line of the third shift fork 46C not engaged with the operation line of none of these shift fork.

When the shift portion 44a is engaged with the operation line of the first shift fork 46A, if the main speed changer lever 19A is operated along the speed changing path 80 to be pivoted fore/aft, the first shift fork 46A is slid from the intermediate position along the vehicle body fore/aft direction, whereby connection is established between the input shaft 5 and either one of the first second-speed gear 20b and the first first-speed gear 20a. That is, the vehicle speed is changed to the "first speed" or the "second speed".

Similarly, when the shift portion 44a is engaged with the operation line of the second shift fork 46B, if the main speed changer lever 19A is operated along the speed changing path 80 to be pivoted fore/aft, the second shift fork 46B is slid from the intermediate position along the vehicle body fore/aft direction, whereby connection is established between the input shaft 5 and either one of the first fourth-speed gear 20d and the first third-speed gear 20c. That is, the vehicle speed is changed to the "third speed" or the "fourth speed".

Further, when the shift portion 44a is engaged with the operation line of the third shift fork 46C, if the main speed changer lever 19A is operated along the speed changing path 80 to be pivoted fore/aft, the third shift fork 46C is slid from the intermediate position along the vehicle body fore/aft direction, whereby connection is established between the input shaft 5 and either one of the first sixth-speed gear 20f and the first fifth-speed gear 20e. That is, the vehicle speed is changed to the "sixth speed" or the "fifth speed".

[Urging Mechanism]

The urging mechanism 46 mentioned above will be detailed next. As shown in FIG. 11, of the boss portion 40a on the vehicle body inner side, the hole diameter of the boss portion 40a is increased and also the outer diameter of the operation shaft 44 is decreased, thereby to form a space for disposing the urging mechanism 45. The urging mechanism 45 includes a spring 45a, a spring 45b, a ring-shaped inner diameter side end member 45c, a cylindrical outer diameter side end member 45d, a ring-shaped inner diameter side end member 45e and a ring-shaped outer diameter side end member 45f.

On the diameter-reduced portion of the operation shaft 44, the inner diameter side end member 45c and the inner diameter side end member 45e are fitted in this mentioned order from the vehicle body outer side. And, withdrawal thereof is prevented by means of a stopper ring 45g from the vehicle body inner side. Further, the spring 45a is interposed between the inner diameter side end member 45c and the inner diameter side end member 45e. With the urging force of the spring 45a, the inner diameter side end member 45c is urged to come into contact with the reduced diameter stepped portion of the operation shaft 44, whereas the inner diameter side end portion 45e is urged to come into contact with the stopper ring 45g.

In the diameter-increased portion of the boss portion 40a, the outer diameter side end member 45d and the outer diameter side end member 45f are fitted in this mentioned order from the vehicle body outer side. And, withdrawal thereof is prevented by means of a stopper ring 45h from the vehicle body inner side. In the outer diameter side end member 45d and at the cylindrical vehicle body inner side terminal end, there is provided a portion folded in the form of a flange toward the radially inner side. And, between this folded portion and the outer diameter side end member 45f, the spring 45b is interposed. With the urging force of the spring 45b, the outer diameter side end member 45d is urged to come into contact with the increased diameter stepped portion of the boss portion 40a whereas the outer diameter side end portion 45f is urged to come into contact with the stopper ring 45h.

The outer diameter of the inner diameter end portion 45c is set greater than the inner diameter of the folded portion of the outer diameter side end portion 45d, so that relative movement of the inner diameter side end member 45c relative to the outer diameter side end member 45d is possible only within the range of the cylindrical portion of the outer diameter side end portion 45d. Further, the outer diameter of the inner diameter side end member 45e is set greater than the inner diameter of the outer diameter side end member 45f, so that absolute movement of the inner diameter side end member 45e toward the vehicle body inner side is possible to the position of the stopper ring 45h via the outer diameter side end member 45f.

With the above-described arrangements, when the main speed changer lever 19A is pivoted from the state shown in FIG. 11 (the FIG. 12 position of the main speed changer lever 19A) to the vehicle body outer side (toward the "fifth speed" and "sixth speed") thereby to cause the operation shaft 44 to be slid toward the vehicle body inner side, the inner diameter side end member 45c is moved toward the vehicle body inner side and the spring 45a is compressed. However, the outer diameter side end member 45d is not moved. Therefore, the main speed changer lever 19A is subjected to only the urging force of the spring 45a. When the operation shaft 44 is further slid toward the vehicle body inner side, the inner diameter side end member 45c comes into contact with the folded portion of the outer diameter side end member 45d, whereby the outer diameter side end member 45d too begins to move toward the vehicle body inner side. That is, the spring 45b too begins to be compressed. Namely, from this state, the main speed changer lever 19A is subjected to the urging forces of both the spring 45a and the spring 45b. Hence, compared with the case of the main speed changer lever 19A being subjected to the urging force of the spring 45a alone, the operational resistance increases to some extent.

In this embodiment, a setting arrangement is made such that the inner diameter side end member 45c comes into contact with the folded portion of the outer diameter end member 45d when the main speed changer lever 19A is located at a border position between the neutral path 81 and the linking path 82. So that, with the increase in the operational resistance due to the addition of the urging force of the spring 46b, the driver can feel the border between the neutral path 81 and the linking path 82. Therefore, inadvertent operation of the main speed changer lever 19A into the linking path 82 can be restricted. Further, since the main speed changer lever 19A can be readily located at the starting end of the speed changing paths 80 for the "fifth speed" and "sixth speed" extending from the border between the neutral path 81 and the linking path 82, speed changing operations to these speed changing paths 80 can be facilitated.

On the other hand, when the main speed changer lever 19A is pivoted from the state shown in FIG. 11 (the FIG. 12 position of the main speed changer lever 19A) to the vehicle body inner side (toward the "first speed" and "second speed") thereby to cause the operation shaft 44 to be slid toward the vehicle body outer side, the inner diameter side end member 45e is moved toward the vehicle body outer side and the spring 45a is compressed. However, the outer diameter side end member 45f is not moved. Therefore, the main speed changer lever 19A is subjected to only the urging force of the spring 45a. Thereafter too, no operation force is applied to the spring 45b.

That is, the spring 45a functions whichever path the main speed changer lever 19A is located in. Whereas, the spring 46b functions only when the main speed changer lever 19A is located in the linking path 82 or the second locking path 85. Incidentally, the urging force of the spring 45a is set such that the main speed changer lever 19A may be at the starting end of the speed changing path 80 for the "third speed" and the starting end of the speed changing path 80 for the "fourth speed", when the spring 45a is not compressed or tensed, that is, in the neutral state with the spring providing no urging force.

[Auxiliary Speed Changer Lever]

The auxiliary speed changer lever 19B, as shown in FIGS. 4 through 6, has its lower end supported to the support shaft 43 to be pivotable about the axis X. To the inner face of the cover member 40, an auxiliary speed changing shift fork 48 is supported to be slidable along the vehicle body fore/aft direction. The auxiliary speed changing lever 19 and the auxiliary speed changing shift fork 48 are linked to each other via a link mechanism 47. When the auxiliary speed changer lever 19B is pivoted in the fore/aft direction, the auxiliary speed changing shift fork 48, as described above, is slid along the vehicle body fore/aft direction (the axial direction of the output shaft 9).

When the auxiliary speed changer lever 19B is pivoted most forwardly, the auxiliary speed changing shifter 32 establishes no connection between the high speed gear 30 or the low speed gear 31 and the output shaft 9. If the auxiliary speed changer lever 19b is pivoted rearward from the above condition, the auxiliary speed changing shifter 32 is slid forwardly to provide the "low speed state". If the auxiliary speed changer lever 19B is pivoted further rearward from the "low speed state", the auxiliary speed changing shifter 32 is slid further forwardly to provide the "high speed state".

[Parking Brake Mechanism]

Figure 7:
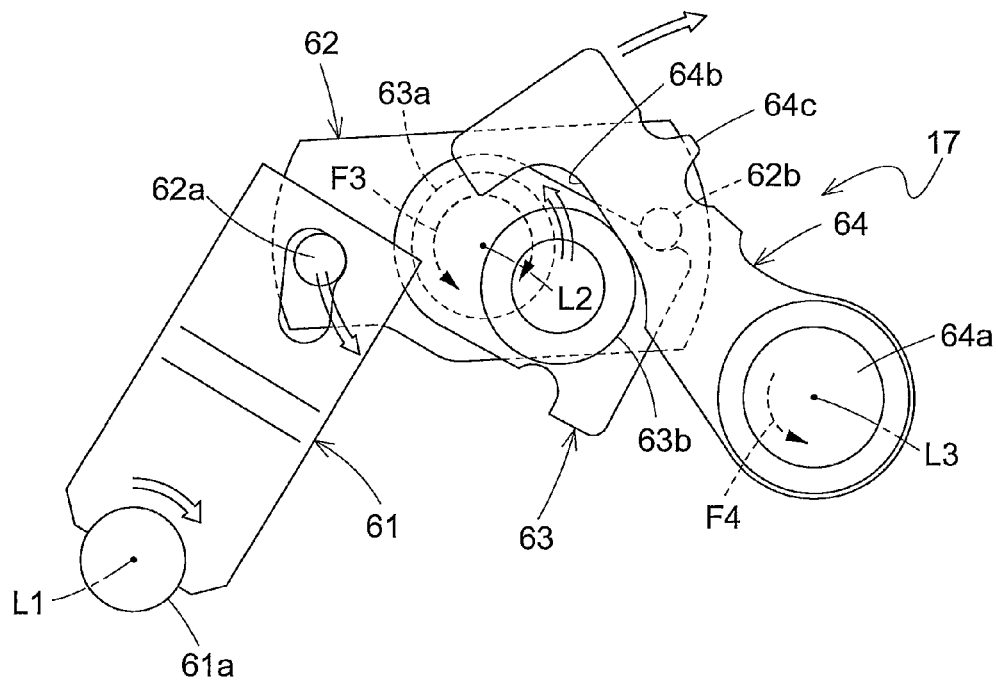
FIG. 7 is a front view of a parking brake mechanism.
Figure 8:
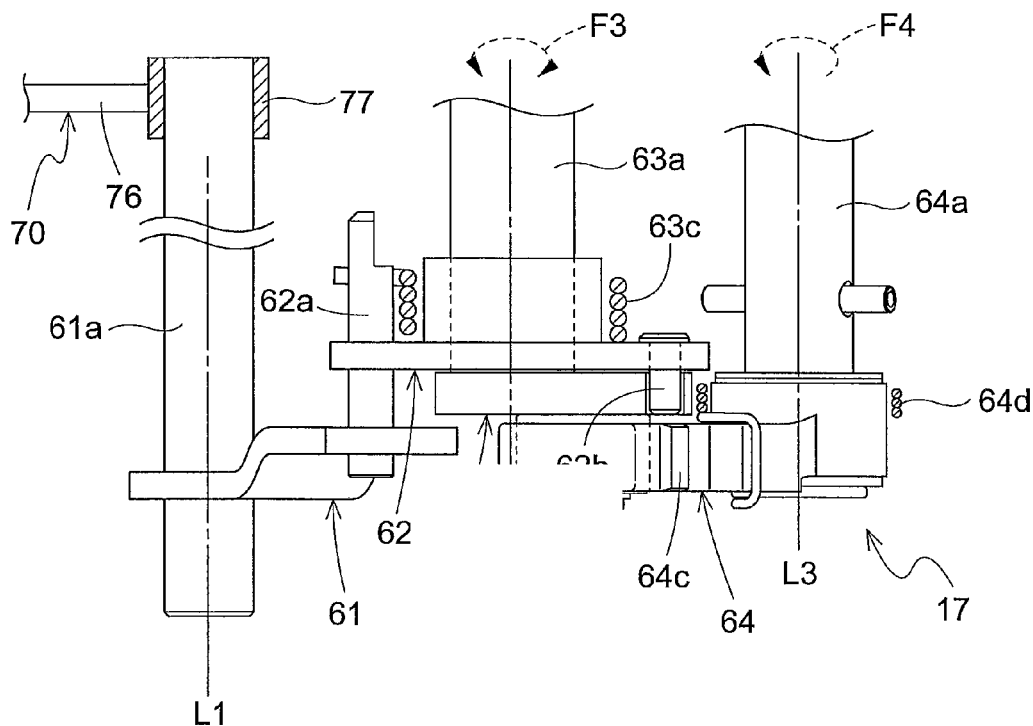
FIG. 8 is a top view of the parking brake mechanism.

The parking brake mechanism 17, as shown in FIG. 2 and FIG. 5, is disposed inside the transmission case MC and is meshed with the output gear 9a splined on the output shaft 9 of the transmission mechanism TM, thereby to be capable of restricting movement of the transmission mechanism TM. The parking brake mechanism 17, as shown in FIG. 7 and FIG. 8, includes a first member 61, a second member 62, a third member 63, and a fourth member 64. The first member 61 includes a shaft portion 61a. The shaft portion 61a has its lower end supported to a partition member SP (see FIG. 3) which partitions the inner space of the transmission case MC into the fore section and the aft section, to be pivotable about a first axis L1 extending along the vehicle body fore/aft direction. The rear end portion of the shaft portion 61a is extended to the outside of the transmission case MC to be connected, outside the transmission case MC, with an operation boss member 77 of a second link mechanism 70 to be described later. When the main speed changer lever 19A is pivoted forwardly along the braking path 83 (toward the first locking path 84), its operational force is transmitted via the second link mechanism 70 to the first member 61, whereby the first member 61 is pivoted clockwise about the first axis L1 (see the outline arrow in FIG. 7). Conversely, when the main speed changer lever 19A is pivoted rearwardly along the braking path 83 (toward the linking path 82), the first member 61 is pivoted counterclockwise about the first axis L1.

The third member 63 includes a shaft portion 63a and a slidable portion 63b. The shaft portion 63a projects toward the vehicle body rear side and has its rear end supported to the partition member SP to be pivotable about a second axis L2 extending parallel with the first axis L1. The slidable portion 63b projects toward the vehicle body forward side and comes into slidable contact with a recess 64b of the fourth member 64 to be described later.

The second member 62 includes a first pin portion 62a engaged in a loose hole formed at the upper end of the first member 61 and a second pin portion 62b contacting the upper face of the third member 63. The second member 62 is fitted on the shaft portion 63a of the third member 63 and is pivotable relative to the third member 63 about the second axis L2.

Between and across the second member 62 and the third member 63, a spring 63c is fitted on the shaft portion 63a of the third member 63. The urging force f3 of the spring 63c acts on the third member 63 to cause this member 63 for pivoting it counterclockwise relative to the second member 62 as seen in the front view (see the dot line arrows in FIGS. 7 and 8) and further acts on the second member 62 to cause this member 62 for pivoting it clockwise relative to the third member 63 as seen in the front view.

More particularly, when the first member 61 is pivoted clockwise, the second member 62 is pivoted counterclockwise via the fist pin portion 62a (see the outline arrow in FIG. 7). In the course of this, the second pin portion 62b tends to move away from the upper face of the third member 63, so that under the urging force F3 of the spring 63c, the third member 63 too, following the second member 62, will be pivoted counterclockwise.

The fourth member 64 is a component meshed with the output gear 9a (see FIG. 10) and includes a shaft portion 64a, the recess 64b, and a pawl portion 64c. The shaft portion 64a projects toward the vehicle body rear side and has its lower end supported to the partition member SP to be pivotable about a third axis L3 which extends in parallel with the first axis L1 and the second axis L2. The recess 64b is formed in the face opposite the output gear 9a and comes into contact with the slidable portion 63b to receive its sliding force. The pawl portion 64c is formed on the face on the side of the output gear 9a and can be meshed with the output gear 9a. On the shaft portion 64a, a spring 64d is fitted. The fourth member 64 is urged counterclockwise as seen in the front view, by the urging force F4 of the spring 64d (see the dotted arrows in FIG. 7 and FIG. 8).

That is, when the third member 63 is pivoted counterclockwise, the slidable portion 63b slides relative to the recess 64b and the fourth member 64 is pivoted clockwise against the urging fore F4 (see the outline arrow in FIG. 7).

Incidentally, the parking brake mechanism 17 is configured such that the operation shaft 44 can slide toward the inner side of the transmission case MC even after meshing of the pawl portion 64c with the output gear 9a, i.e. to allow the so-called "over-shift" of the main speed changer lever 19A. In this case, the terminal end side of the braking path 83 constitutes the path for the over-shift.

At the time of over-shift, as the first member 61 is pivoted clockwise, the second member 62 is pivoted counterclockwise, as usual. However, the fourth member 64 is not pivoted clockwise any further since its pawl portion 64c is meshed with the output gear 9a. Therefore, the second pin portion 62b will move away from the upper face of the third member 63. As a result, the second pin portion 62b and the upper face of the third member 63 are separated from each other, thereby to charge additional urging force in the spring 63c. This urging force is transmitted via the second link mechanism 70 to the main speed changer lever 19A, thereby to urge this main speed changer lever 19A toward the vehicle body rear side. With the arrangement of the spring 63c, when the main speed changer lever 19A is located in the second locking path 85, under the charged urging force described above, the main speed changer lever 19A is urged toward the terminal end of the second locking path 85, thus preventing inadvertent withdrawal into the first locking path 84.

Figure 10:
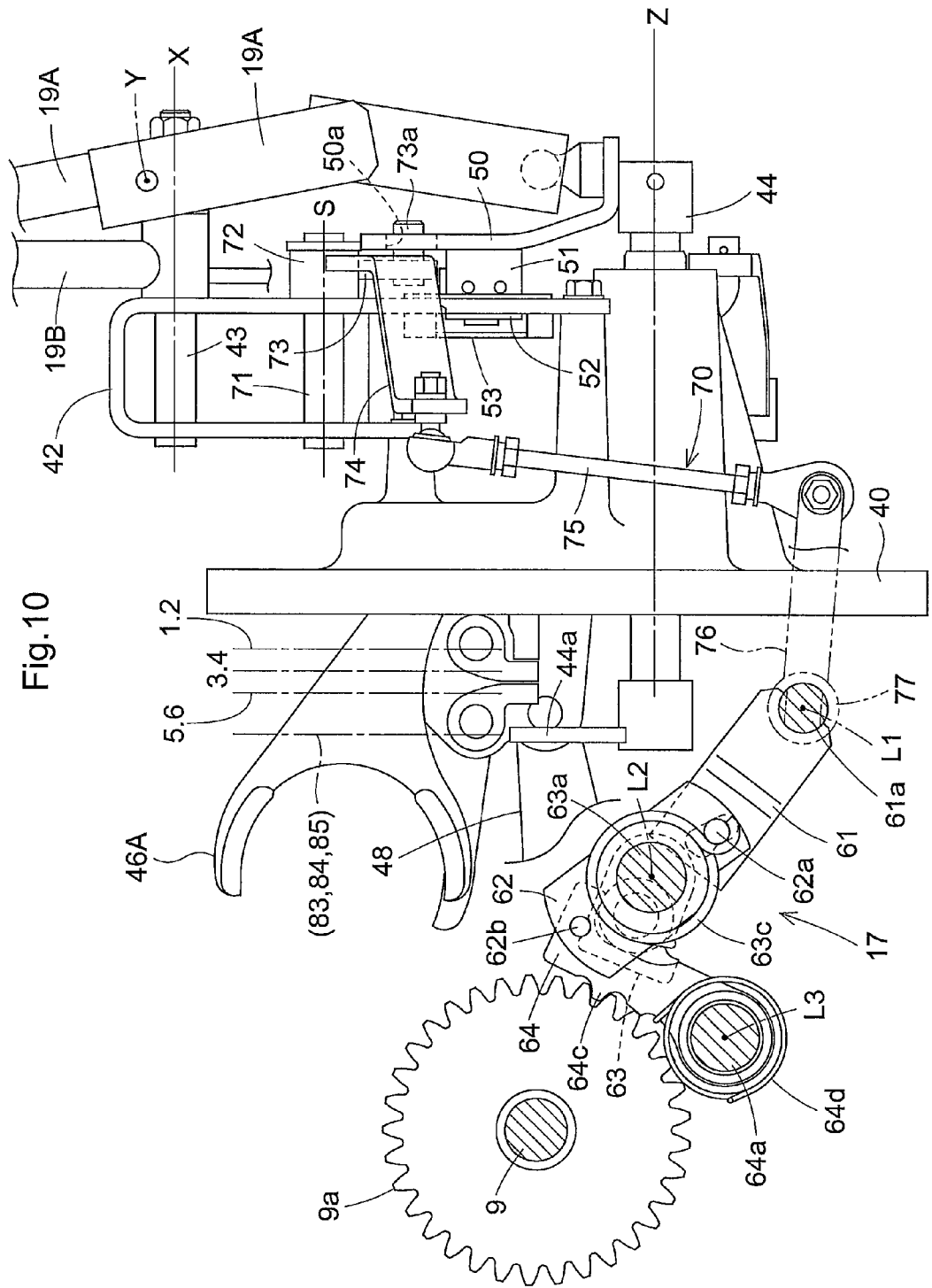
FIG. 10 is a rear view showing the parking brake mechanism under a restricted state.

Lastly, the operations of the parking brake mechanism 17 based on operations of the main speed changer lever 19A will be explained one by one. When the main speed changer lever 19A is located in any one of the speed changing paths 80, the neutral path 81 and the linking path 82, the pawl portion 64c is not meshed with the output gear 9a. When the main speed changer lever 19A is operated from the linking path 82 to the braking path 83, the first member 61 through the fourth member 64 are pivoted in association therewith via the second link mechanism 70. When the main speed changer lever 19A is located at the terminal end of the braking path 83, as shown in FIG. 10, the pawl portion 64c is meshed with the output gear 9a, thereby to restrict movement of the transmission mechanism TM, thus applying a parking brake.

[Second Link Mechanism]

The second link mechanism 70 is provided for allowing linking or release of linking between the main speed changer lever 19A and the parking brake mechanism 17. The second link mechanism 70, as shown in FIG. 4, FIG. 8, FIG. 9, FIG. 11 and FIG. 14, is provided, outside the transmission case MC, between the main speed changer lever 19A and the rear end of the shaft portion 61a of the first member 61 included in the parking brake mechanism 17. The second link mechanism 70 includes a pin-like shaft member 71, a tubular member 72, a plate-like first arm member 73, a plate-like second arm member 74, a bar-like rod member 75, a plate-like lever member 76 and a tubular operational boss member 77.

The shaft member 71, as shown in FIG. 9 and FIG. 11, is fixed between the vehicle body right/left inner and outer faces of the bracket 42 under a posture (posture along the vehicle body right/left direction) parallel with the support shaft 43, downwardly of this support shaft 43. The vehicle body outer side end portion of the shaft member 71 projects toward the vehicle body outer side beyond the outer face of the bracket 42.

At the leading end of the shaft member 71, the tubular member 72 is supported to be pivotable about a pivot axis S which constitutes the axis of the shaft member 71 and which extends along the vehicle body right/left direction. As shown in FIG. 4, to the outer face of the tubular member 72, one end of the first arm member 73 is fixed and also one end of the second arm member 74 is fixed. Incidentally, the first arm member 73 is set to a posture oriented toward the vehicle body downward side. With this, when the first arm member 73 is pivoted about the pivot axis S via the tubular member 72, the second arm member 74 too is pivoted about the pivot axis S.

One end of the rod member 75 is pivotally supported to the other end of the second arm member 74. The rod member 75 assumes a vertically oriented posture. When the second arm member 74 is pivoted, the rod member 75 is pivoted up/down.

One end of the lever member 76 is pivotally supported to the rear face of the other end of the rod member 75 and as shown in FIG. 8 and FIG. 9, the operational boss member 77 is fixed to the other end of the lever member 76 and the operational boss member 77 is connected to the rear end portion of the first member 61. The lever member 76 assumes a posture along the vehicle body right/left direction. When the rod member 75 is pivoted vertically, the lever member 76 is pivoted about the first axis L1 of the first member 61 along the vehicle body fore/aft direction.

As shown in FIG. 11 and FIG. 14, to the outer face of the first arm member 73, a pin-like projecting portion 73a is fixed under a posture along the vehicle body right/left direction. Further, to the upper face of the end of the operation shaft 44, there is fixed a plate-like support member 50 extending upward to the vicinity of the side of the bracket 42. At an upper end front side of the support member 50, there is formed a hole portion 50a in the form of an elongate slot and capable of receiving the projecting portion 73a therein. When the projecting portion 73a enters the hole portion 50a, linkage is established between the main speed changer lever 19A and the parking brake mechanism 17 via the second link mechanism 70. Next, this linkage will be described. Incidentally, the support member 50 corresponds to what is referred to as "a component included in the operation lever" and the first arm member 73 corresponds to what is referred to as "a component included in the second link mechanism" in the context of the present invention.

When the main speed changer lever 19A is operated to any one of the speed changing paths 80 and the neutral path 81, as shown in FIG. 9 and FIG. 11, the hole portion 50a is separated from the projecting portion 73a. That is, when the main speed changer lever 19A is located at the merging point (see FIG. 12) between the starting end of the "fifth speed" speed changing path 80 and the starting end of the "sixth speed" speed changing path 80, in the neutral path 81, the hole portion 50a is separated from the projecting portion 73a. Then, if the main speed changer lever 19A is operated from the neutral path 81 into the linking path 82 (operated toward the vehicle body outer side), the hole portion 50a is displaced toward the vehicle body inner side to approach the projecting portion 73a. Then, when the main speed changer lever 19A is located at the terminal end of the linking path 82, as shown in FIG. 10, the projecting portion 73a enters the hole portion 50a.

Further, when the main speed changer lever 19A is operated from the linking path 82 into the braking path 83 (operated toward the vehicle body forward side), the inner peripheral portion of the hole portion 50a becomes retained to the projecting portion 73a. so that the first member 73 is pivoted toward the vehicle body rear side about the pivot axis S (see FIG. 4). With this, the second arm member 74 is pivoted toward the vehicle body upper side about the pivot axis S and the rod member 75 is pivoted upward (see FIG. 4 and FIG. 10). Eventually, the lever member 76 is pivoted toward the vehicle body upper side about the first axis L1 (see FIG. 10). As a result, the first member 61 of the parking brake mechanism 17 is pivoted toward the vehicle body downward side about the first axis L1 (the direction of outline arrow in FIG. 7), whereby the parking brake mechanism 17 is activated to apply parking brake.

Incidentally, after the above, as the main speed changer lever 19*a* is operated into the second locking path 83 via the first locking path 84, the locking mechanism 18 will be activated to maintain the application of the parking brake. Further, since the parking brake operation can be effected only with the pivotal operation of the main speed changer lever 19A as described above, there is no need for the driver to switch his/her hand over to another lever specially provided therefor or no need for any special operation different from the pivotal operation which is the normal operation of the main speed changer lever 19A. Hence, there is provided excellent operability.

Incidentally, the length of the projecting portion 73*a* is set shorter than the amount of movement (displacement) of the hole portion 50*a* in the direction along the linking path 82 (vehicle body right/left direction) in case the main speed changer lever 19A is operated along the linking path 82. Further, the length of the projecting portion 73*a* is set longer than the amount of movement (displacement) of the hole portion 50*a* in the direction along the linking path 82 (vehicle body right/left direction) in case the main speed changer lever 19A is operated along the first locking path 84.

Therefore, when the main speed changer lever 19A is returned from the linking path 82 to the neutral path 81, the projecting portion 73*a* moves out of the hole portion 50*a* in a reliable manner, so that the parking brake mechanism 17 will not be actuated inadvertently when the main speed changer lever 19A is located in the speed changing paths 80 or the neutral path 81. Further, there occurs no inadvertent withdrawal of the projecting portion 73*a* out of the hole portion 50*a* in the course of the operation of the main speed changer lever 19A along the first locking path 84. With this, there occurs no inadvertent release of linkage by the second link mechanism 70 in the course of a parking brake operation, so that the reliability and stability of the parking brake operation are improved.

[Locking Mechanism]

The locking mechanism 18 is provided for locking the position of the main speed changer lever 19A, thereby to maintain the application of parking brake. The locking mechanism 18, as shown in FIG. 14, FIG. 9, FIG. 11, FIG. 13A-FIG. 15, includes a hook-like portion 52 as a "retaining portion" fixed downwardly of the hole portion 50*a* of the above-described support member 50 and a receiving member 52 as a "retained portion" connected to the above-described bracket 42. The bracket 42 serves as a component for supporting the main speed changer lever 19A, a component for supporting the auxiliary speed changer lever 19B, a component for supporting the receiving member 53 and a component for pivotally supporting the first arm member 73 having the projecting portion 73*a*. Incidentally, the bracket 42 corresponds to what is referred to as "a component which remains stationary relative to the operation lever" in the context of the present invention.

The receiving member 53, as shown in FIGS. 13A-15, is formed in the shape of a hat having a center portion thereof recessed as seen in the plane view. In the vehicle body outer side face of the bracket 42, the portion downwardly of the support shaft 43 and the shaft member 71 is cut out in the rectangular form, and in this cutout portion, the projecting portion of the receiving member 53 is inserted and the remaining flange-like portion is bolt-fixed to the bracket 42. In the corner portion of the receiving member 53 on the vehicle body rear side, there is formed a first opening portion 63*a* in which the hook-like portion 53 can enter along the vehicle body fore/aft direction. Further, a hook portion 53*b* is provided at the vehicle body outer side peripheral edge of the first opening portion 63*a*. This hook portion 53*b* is formed by folding a portion of the receiving member 63 adjacent the first opening portion 63*a* toward the vehicle body rear side.

Figure 15:
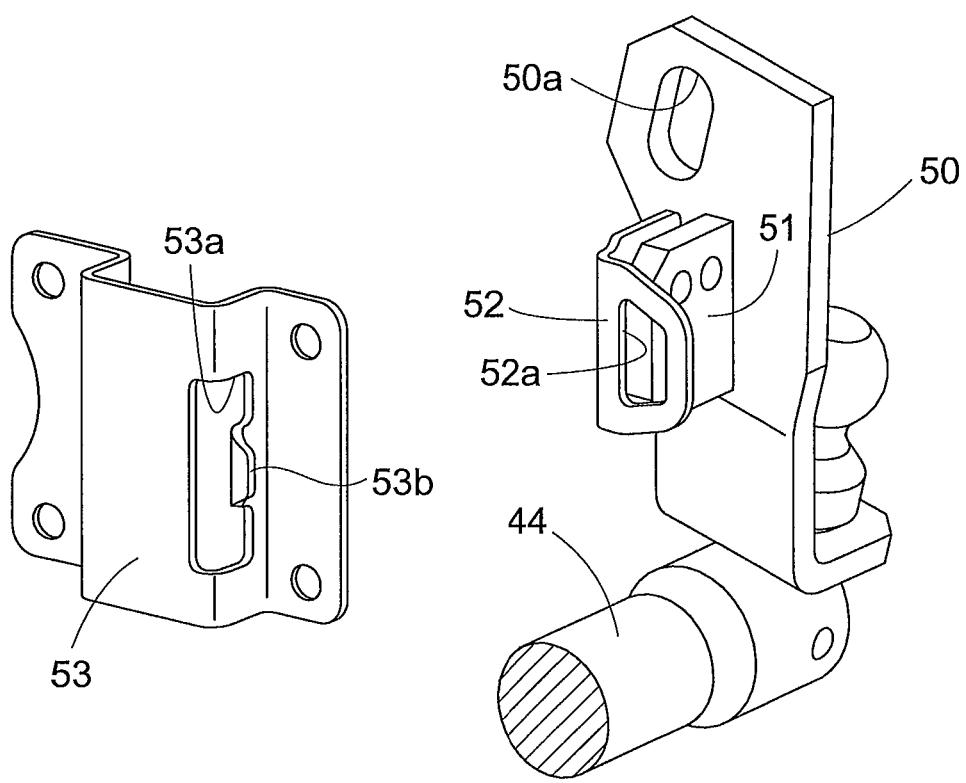
FIG. 15 is an exploded perspective view of a locking mechanism, as seen from the side opposite FIG. 14.

The hook-like portion 52, as shown in FIG. 14 and FIG. 15, is fixed to the support member 50 via a plate-like attaching member 51 extending along the vehicle body right/left direction. The hook-like portion 52 is formed in the L-shaped folded toward the vehicle body rear side as seen in the plane view. At the vehicle body rear side folded portion of the hook-like portion 52, there is formed a second opening portion 52*a* which the hook portion 53*b* can enter along the vehicle body right/left direction.

Incidentally, since the hook-like portion 52 is located downwardly of the pivot (the axis X and the axis Y) of the main speed changer lever 19A, the hook-like portion 52 effects a movement reverse to the movement of the main speed changer lever 19A. More particularly, in correspondence with a pivotal operation of the main speed changer lever 19A toward the vehicle body forward side, a pivotal operation of the same toward the vehicle body rearward side, a pivotal movement of the same toward the vehicle body outer side and a pivotal movement of the same toward the vehicle body inner side, the hook-like portion 52 is moved toward the vehicle body rear side, the vehicle body forward side, the vehicle body inner side and the vehicle body outer side, respectively.

Figure 13A:
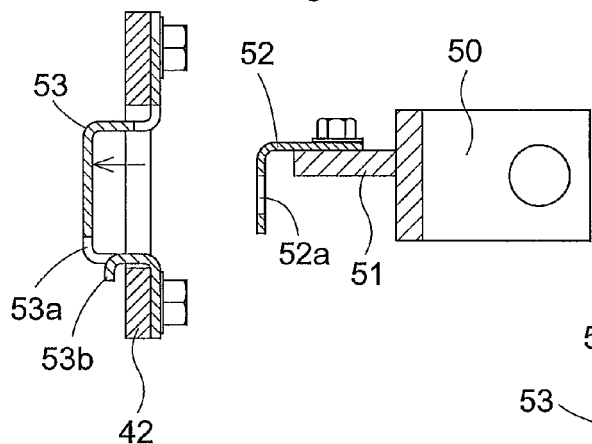
FIG. 13A is a top view in section showing a condition of a locking mechanism corresponding to an operation of the main speed changer lever, the view showing a condition when the main speed changer lever is located in a neutral path.

Next, movements of the locking mechanism 18 will be explained with reference to FIGS. 13A-E. When the main speed changer lever 19A is operated for a speed changing operation, that is, when the main speed changer lever 19A is located in any one of the neutral path 81 and the speed changing paths 80, as shown in FIG. 13A, the hook-like member 52 is separated from the bracket 42 and the receiving member 53. Therefore, the speed changing operation of the main speed changer lever 19A will not be hindered by the locking mechanism 18.

Figure 13B:
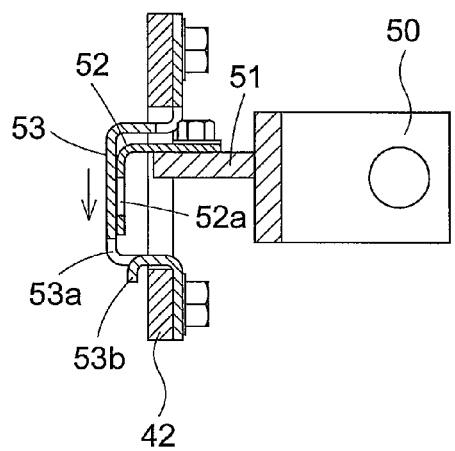
FIG. 13B is a top view in section showing a condition of the locking mechanism corresponding to an operation of the main speed changer lever, the view showing a condition when the main speed changer lever is located at the terminal end of a braking path.

For applying a parking brake and as a preliminary step therefor, when the main speed changer lever 19A is moved away from the neutral path 81 and operated along the linking path 82 to the terminal end of this linking path 82, as shown in FIG. 13B, the hook-like member 52 is moved toward the vehicle body inner side to come into contact with the recessed portion of the receiving member 53. In the course of this, in the second link mechanism 70, as shown in FIG. 10, the projecting portion 73*a* enters the hole portion 50*a*, thereby to establish linkage between the main speed changer lever 19A and the parking brake mechanism 17, so that the operation of the main speed changer lever 19A can now be transmitted to the parking brake mechanism 17.

Figure 13C:
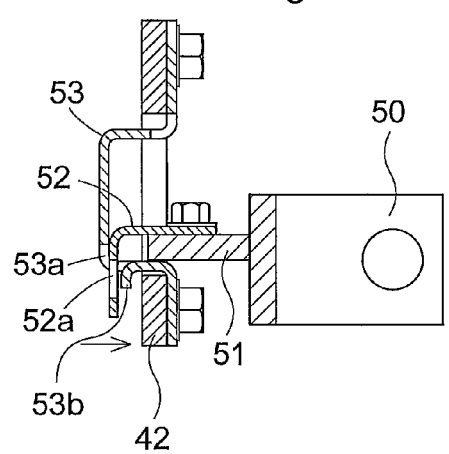
FIG. 13C is a top view in section showing a condition of the locking mechanism corresponding to an operation of the main speed changer lever, the view showing a condition when the main speed changer lever is located in a first locking path.

In succession to the above, when the main speed changer lever 19A is operated from the terminal end of the linking path 82 to the terminal end of the braking path 83, as shown in FIG. 13C, the hook-like member 52 is moved along the receiving member 53 toward the vehicle body rear side and enters the first opening portion 53*a*. In this, the second opening portion 52*a* is brought into opposition to the hook portion 53*b*. Simultaneously, the operation of the main speed changer lever 19A is transmitted via the second link mechanism 70 to the parking brake mechanism 17, so that the parking brake mechanism 17 is activated to apply parking brake.

Incidentally, the gap between the recessed portion and the hook portion 53*b* of the receiving member 53 is set to be slightly greater than the thickness of the hook-like portion 52. Hence, unless the main speed changer lever 19A is located securely at the terminal end of the linking path 82, the hook-like member 52 is unable to enter the first opening portion 53a. With this, it is possible to advise the driver of a reliable lever operation.

Figure 13D:
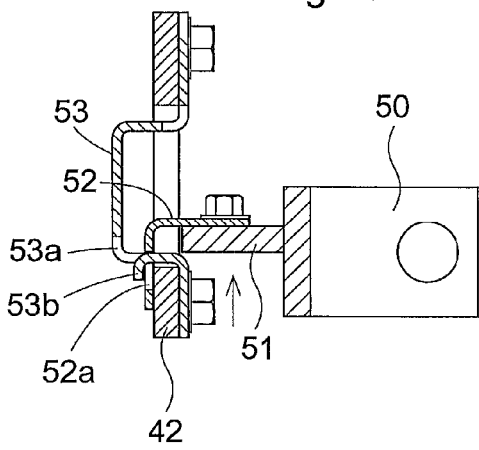
FIG. 13D is a top view in section showing a condition of the locking mechanism corresponding to an operation of the main speed changer lever, the view showing a condition when the main speed changer lever is located in a second locking path.
Figure 13E:
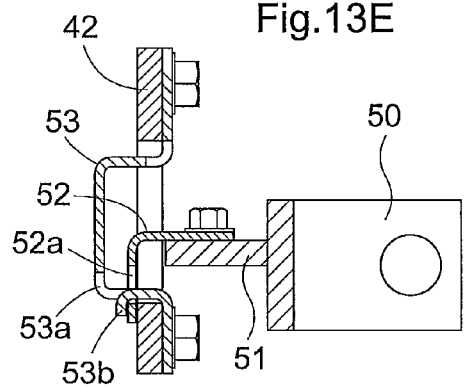
FIG. 13E is a top view in section showing a condition of the locking mechanism corresponding to an operation of the main speed changer lever, the view showing a condition when the main speed changer lever is locked in the second locking path.

Further, when the main speed changer lever 19A is operated from the terminal end of the braking path 83 to the terminal end of the first locking path 84, as shown in FIG. 13D, the hook-like member 52 is moved toward the vehicle body outer side and the hook portion 53b enters the second opening portion 52a. In the course of this, in the second link mechanism 70, only the hole portion 70a slides along the projecting portion 73a, so that the application of the parking brake by the parking brake mechanism 17 is maintained.

And, when the main speed changer lever 19A is operated from the terminal end of the first locking path 84 to the terminal end of the second locking path 85, as shown in FIG. 18E, the hook-like member 52 is moved toward the vehicle body forward side, and retention is established between the hook-like portion 53b and the edge of the second opening portion 52a. In this, under the urging force of the urging mechanism 45 toward the vehicle body inner side and the urging force charged in the spring 63c by the over-shift described above toward the vehicle body forward side, the position of the main speed changer lever 19A is restricted, so that the application of parking brake by the parking brake mechanism 17 is maintained.

[First Alternative Embodiment]

In the foregoing embodiment, there was shown an example wherein the auxiliary speed changer device 8 is switched over among the high speed state, the low speed state and the neutral state. Instead of the neutral state, the auxiliary speed changer device 8 may be configured to be switched over to a "super-low speed state (creep state) which is even lower than the low speed state. In this case, for realizing the super-low speed state, the auxiliary speed changer device 8 will include a creep mechanism 90.

Figure 16:
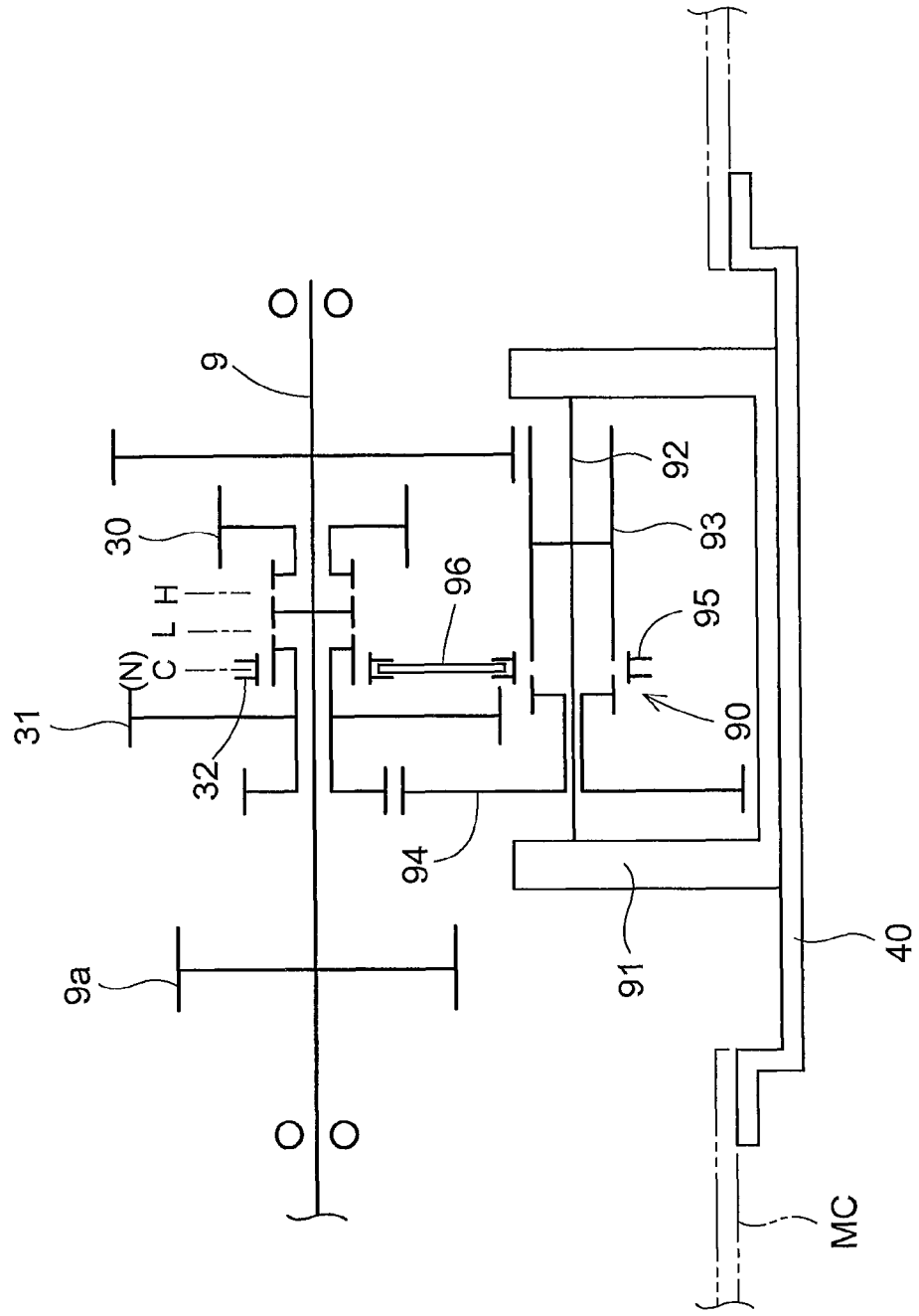
FIG. 16 is a view showing a creep mechanism and a gear train around an auxiliary speed changer device relating to a first alternative embodiment.

The creep mechanism 90, as shown in FIG. 16, is adapted to be attachable and detachable to/from the cover member 40. The creep mechanism 90 includes a support member 91 which is attachable and detachable to/from the cover member 40, and a support shaft 92 supported to the support member 91 to be pivotable along the vehicle body fore/aft direction. The support shaft 92 supports a small gear 93 and a large gear 94 provided in this mentioned order from the vehicle body forward side. The small gear 93 is splined on the support shaft 92 and rotatable in unison with the support shaft 92. The small gear 93 is gear-coupled with the output shaft 9.

The large gear 94 is loosely mounted on the support shaft 92. This large gear 94 is meshed with the output gear 9a of the output shaft 9. Further, between the small gear 93 and the large gear 94, a creep shifter 95 is provided to be slidable along the axis direction of the support shaft 92. When the creep shifter 9 is located between the small gear 93 and the large gear 94 to operably couple the small gear 93 and the large gear 94 with each other, the large gear 94 is rotated in unison with the small gear 93.

The creep shifter 95 is slidably operated by a bifurcated shift fork 96. This bifurcated shift fork 96 is to be attached to the cover member 40 in exchange for the auxiliary shift fork 48 employed in the foregoing embodiment. In the bifurcated shift fork 96, its leading end portion is bifurcated, with one leading end being retained to the auxiliary speed changing shifter 32 and the other leading end being retained to the creep shifter 95. When one leading end portion of the bifurcated shift fork 86 is brought into the neutral state described in the foregoing embodiment, the other leading end portion thereof brings the creep shifter 95 between the small gear 83 and the large gear 94.

More particularly, the power from the output shaft 9 is transmitted via the small gear 93 to the creep mechanism 90 and then transmitted from this small gear 93 to the large gear 94 in the same rotational speed. Thereafter, the power is significantly speed-reduced between the large gear 94 and the output gear 9a and returned as such to the output shaft 9 (super-low speed state).

As described above, with the simple operations of mounting the creep mechanism 90 to the cover member 40 and replacing the auxiliary speed changing shift fork 48 by the bifurcated shift fork 96, auxiliary speed changing operations to/in the three states: "high speed state", "low speed state" and the "super-low speed state" are made possible.

[Second Alternative Embodiment]

This second alternative embodiment is an alternative embodiment of the first link mechanism disclosed in the foregoing embodiment. Next, with reference to FIGS. 17-21, the configuration of the first link mechanism in this second alternative embodiment will be explained. As the rest of the construction is identical to that of the foregoing embodiment, the explanation thereof will be omitted by e.g. providing the same reference numerals/marks.

First, the supporting arrangement for a main speed changer lever 300 (corresponding to the "operation lever") will be explained.

Figure 17:
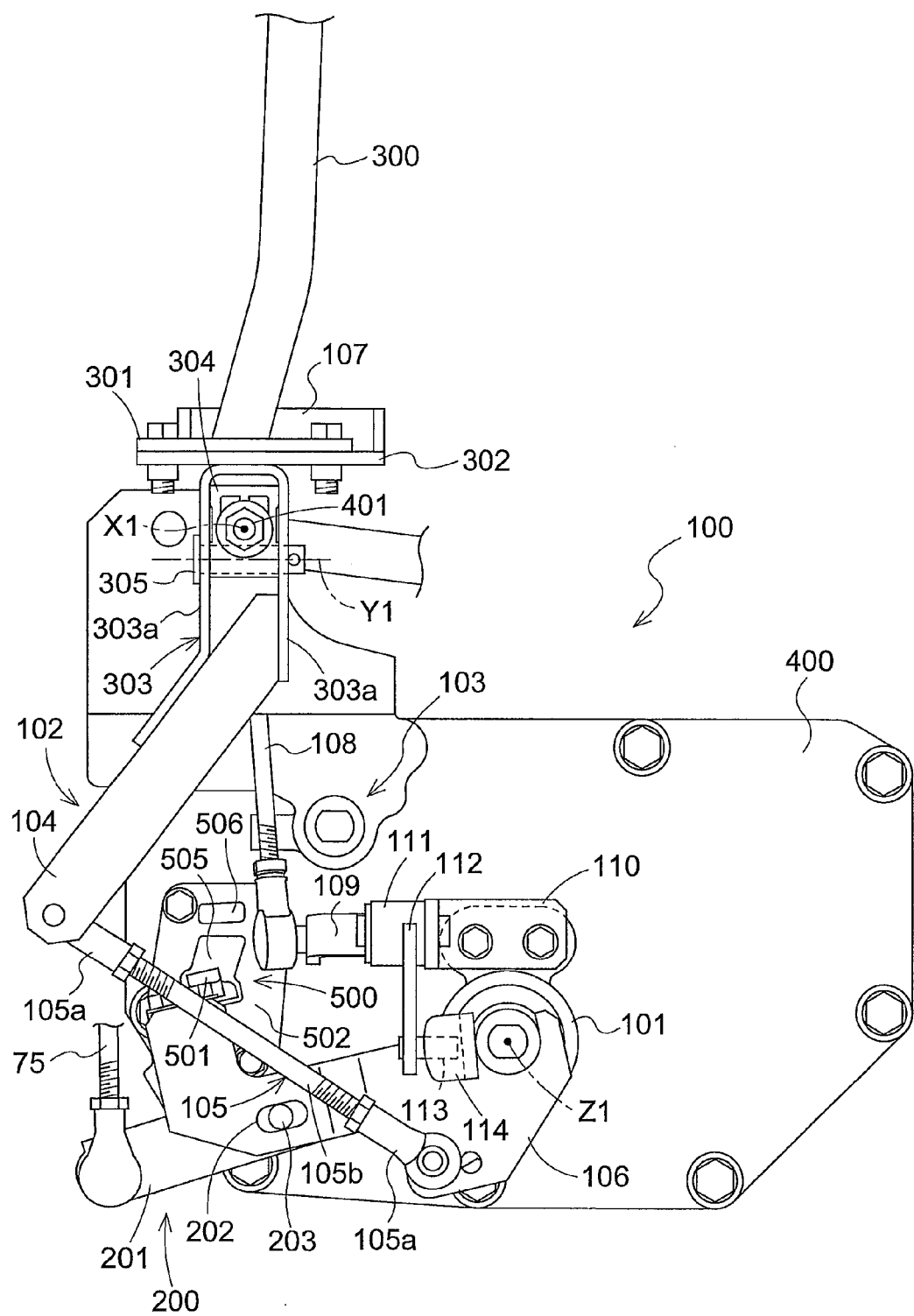
FIG. 17 is a right side view showing a main speed changer lever, a cover member, etc.
Figure 18:
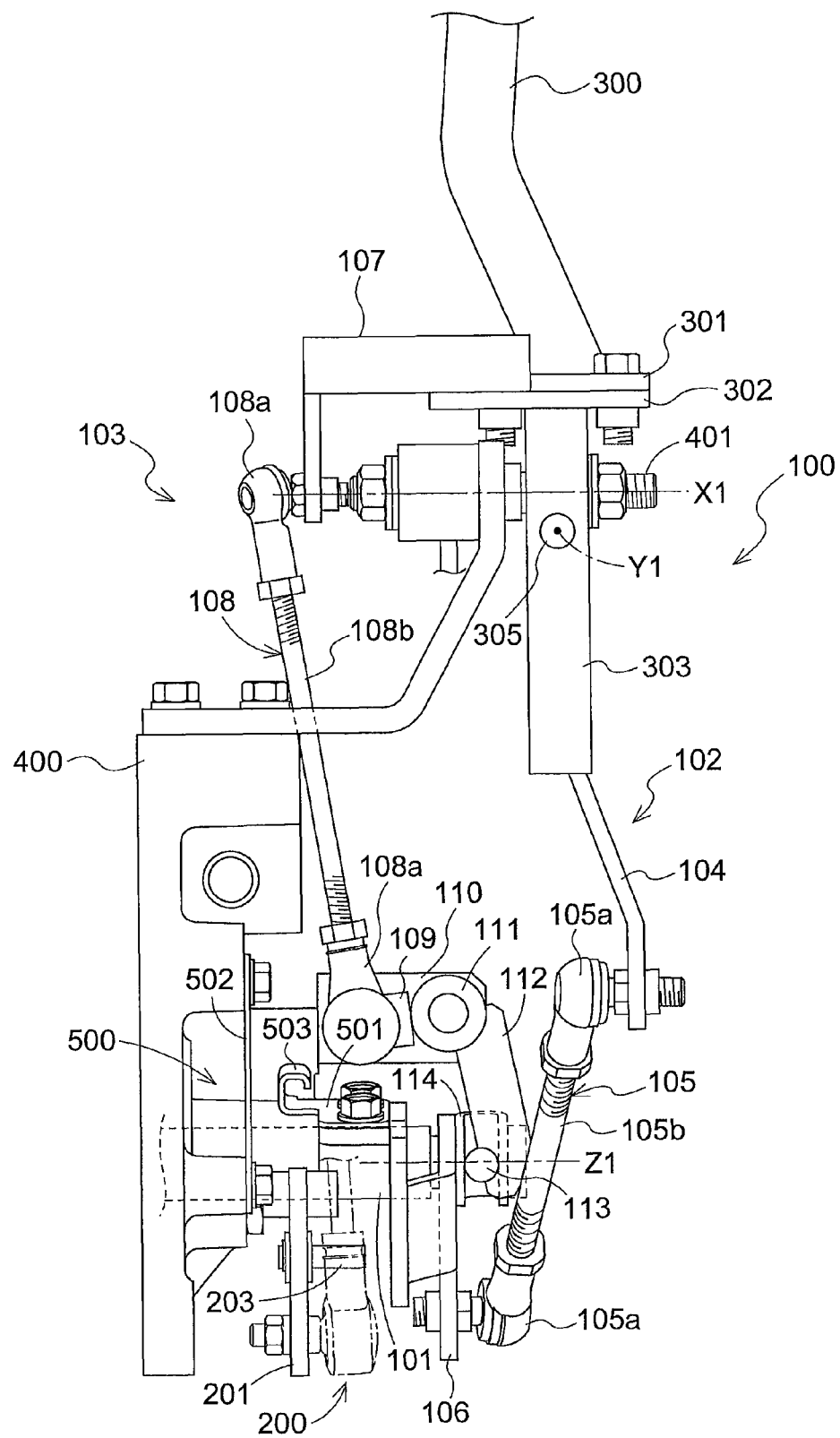
FIG. 18 is a rear view showing the main speed changer lever, the cover member, etc.
Figure 19:
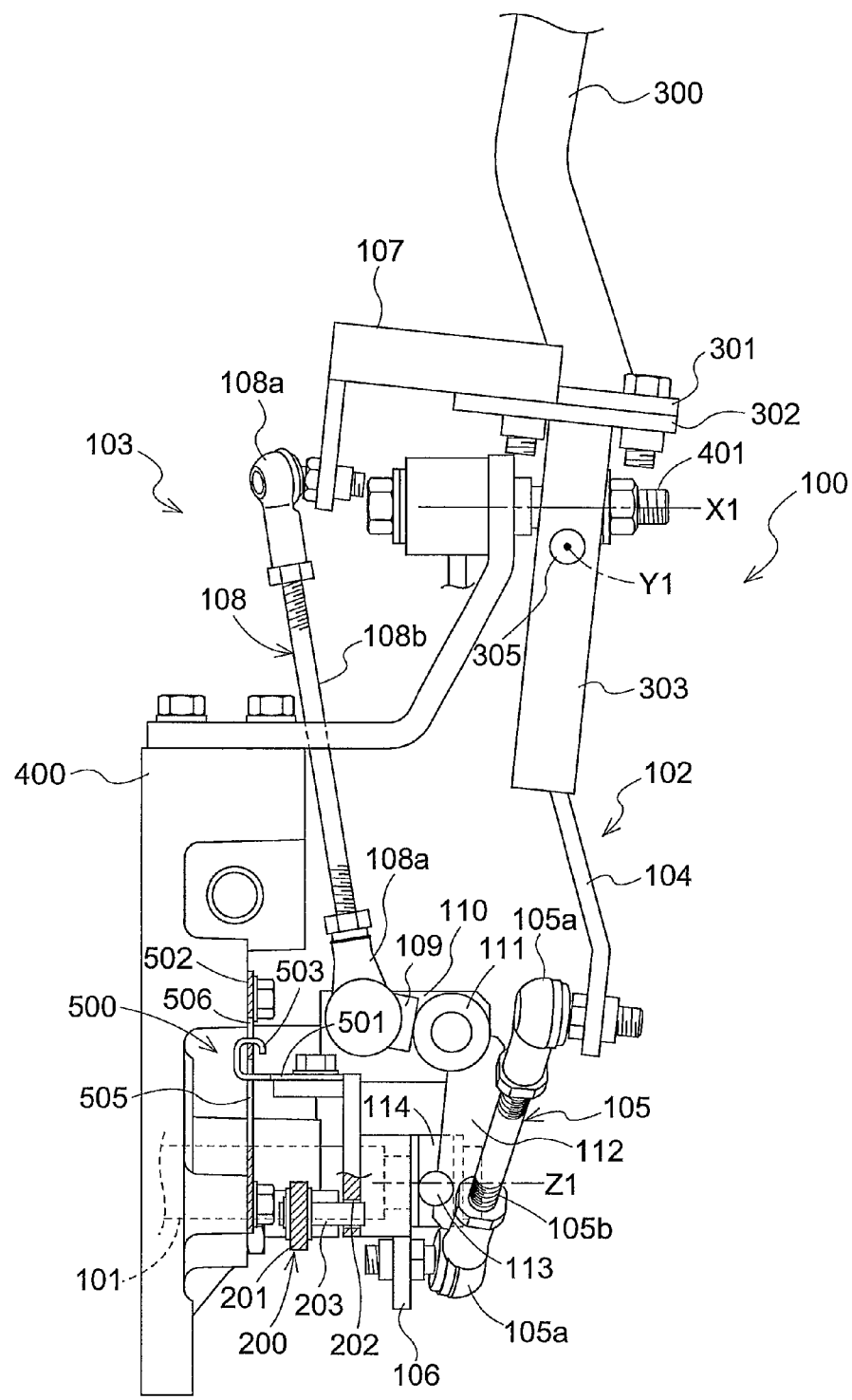
FIG. 19 is a rear view showing the main speed changer lever, the cover member, etc.
Figure 20:
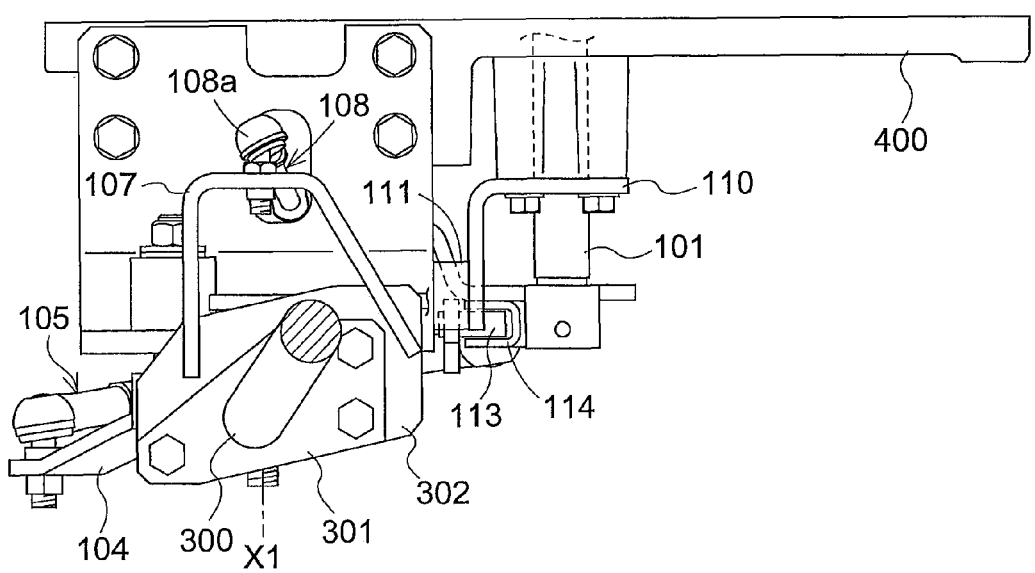
FIG. 20 is a top view showing the main speed changer lever, the cover member, etc.

The main speed changer lever 300, like the foregoing embodiment, as shown in FIGS. 17-19, is supported to be pivotable about an axis X1 extending along the vehicle body right/left direction and pivotable also about an axis Y1 extending along the vehicle body fore/aft direction. FIG. 17, FIG. 18 and FIG. 20 shows a condition when the main speed changer lever 300 is located in the neutral path 81 in FIG. 12. FIG. 19 shows a condition when the main speed changer lever 300 is located in the second locking path 85 in FIG. 12.

Figure 21:
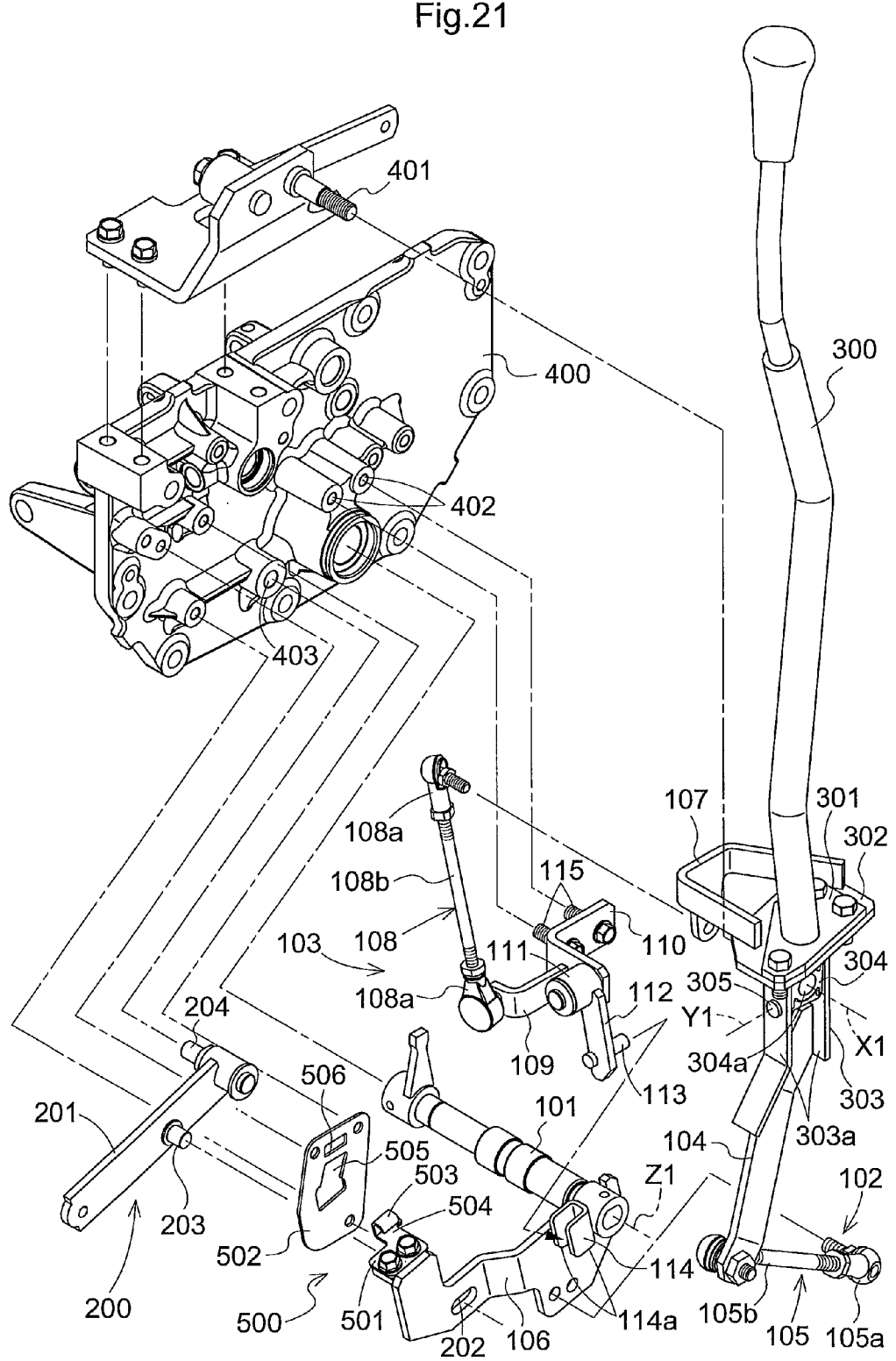
FIG. 21 is an exploded perspective view showing a first link mechanism, a second link mechanism etc.

At the lower end of the main speed changer lever 300, as shown in FIGS. 17-19 and FIG. 21, there is provided a base portion formed by overlapping a plate-like first support body 301 and a plate-like second support body 302 with each other. At the lower end of the second support body 302, there is provided a third support body 303 having extension portions 303a which extend downward with a gap therebetween along the vehicle body fore/aft direction. Between these extension portions 303a, a fourth support body 304 is provided. The third support body 303, as shown in FIG. 17, is comprised of a plate-like member having an angular hook-shape as viewed along the vehicle body right/left direction. As shown in FIG. 21, the fourth support body 304 has a shape having a same thickness as the width between the extension portions 303a in the vehicle body right/left direction and defines a through hole portion 304a in the center portion thereof.

As shown in FIG. 21, as a support shaft 401 provided in a cover member 400 is inserted into the through hole portion 304a, the fourth support body 304 is supported to be pivotable about the axis Xl extending along the vehicle body right/left direction. The first support body 301, the second support body 302, the third support body 303 and the fourth support body 304 are provided to be movable together. With this, the main speed changer lever 300 is supported to be pivotable about the axis Y1 extending along the vehicle body fore/aft direction.

A first link mechanism 100, like the foregoing embodiment, is configured to link the movement of the main speed changer lever 300 with the movement of a movable shaft 101 so that the main speed changer device 6 is speed-changed to each one of the first through sixth speeds in association with a pivotal operation of the main speed changer lever 300.

The first link mechanism 100, as shown in FIG. 21, includes the movable shaft 101 supported to be movable to a plurality of speed positions, a first motion converting mechanism 102 for converting a pivotal operation of the main speed changer lever 300 about the axis X1 along the vehicle right/left direction into a motion of the movable shaft 101 along a first direction, and a second motion converting mechanism 103 for converting a pivotal operation of the main speed changer lever 300 about the axis Y1 along the vehicle body fore/aft direction into a motion of the movable shaft 101 along a second direction. Here, the language "a motion of the movable shaft 101 along a first direction" refers to a pivotal movement about the axis Xl extending along the vehicle body right/left direction. The language "a motion of the movable shaft 100 along a second direction" refers to a slidable movement along the vehicle body right/left direction.

The movable shaft 101 corresponds to the operation shaft 44 employed in the foregoing embodiment and this shaft 101 is supported to the cover member 400 to be pivotable about an axis Z1 extending along the vehicle body right/left direction and slidable along the vehicle body right/left direction. And, like the foregoing embodiment, the movable shaft 101 can be moved to each one of the first through sixth speeds with the pivotal movement about the axis Z1 along the vehicle body right/left direction and the slidable movement along the vehicle body right/left direction.

[First Motion Converting Mechanism]

The first motion converting mechanism 102 includes a first arm member 104 extending downwards from the third support body 302, a first rod member 105 pivotally connected to the lower end of the first arm member 104, and a first coupling member 106 pivotally connected to the lower end of the first rod member 105.

The first rod member 105 includes longitudinal opposed end portions 105a and an intermediate portion 105b, with the respective opposed end portions 105a and the intermediate portion 105b being threaded with each other. With this, as the intermediate portion 105b is rotated relative to the opposed end portions 105a, the length of the first rod member 105 can be adjusted. With this length adjustment of the first rod member 105, the relative position between the main speed changer lever 300 and the movable shaft 101 along the vehicle body fore/aft direction can be adjusted. Hence, the first rod member 105 is constituted as a "first position adjusting member". The first coupling member 106 is fixedly supported to the movable shaft 101 and is formed as a plate-like member extending radially outwardly of the movable shaft 101. At an intermediate portion of the first coupling member 106 along its extension direction, the first rod member 105 is connected.

When the main speed changer lever 300 is pivoted about the axis X1 extending along the vehicle body right/left direction, this motion of the main speed changer lever 300 is transmitted via the first arm member 104 and the first rod member 105 to the first coupling member 106, whereby the first coupling member 106 is pivoted about the axis extending along the vehicle body right/left direction; and the movable shaft 101 coupled to this first coupling member 106 is pivoted about the axis Z1 extending along the vehicle body right/left direction.

[Second Motion Converting Mechanism]

The second motion converting mechanism 103 includes a first extension member 107 extending from the second support body 302 toward the vehicle body side in the vehicle body right/left direction and a second rod member 108 pivotally connected to the lower end of this first extension member 107. The second motion converting mechanism 103 further includes a second arm member 109 pivotally connected to the lower end of the second rod member 108, a third arm member 110 fixedly supported to the cover member 400, a first cylindrical member 111 connected to the end of the second arm member 109, and a fourth arm member 112 provided to extend radially outwardly of the first cylindrical member 111. Further, the second motion converting mechanism 103 includes a second coupling pin member 113 provided at the leading end of the fourth arm member 112 and a second coupling member 114 coupled to this second coupling pin member 113.

The first extension member 107 has an angular hook shape as seen in the plane view. The second rod member 108 includes longitudinally opposed end portions 108a and an intermediate portion 108b, with the respective opposed end portions 108a and the intermediate portion 108b being threaded with each other. With this, when the intermediate portion 108b is rotated relative to the opposed end portions 108a, the length of the second rod member 108 can be adjusted. With this length adjustment of the second rod member 108, the relative position between the main speed changer lever 300 and the movable shaft 101 along the vehicle body right/left direction can be adjusted. Hence, the second rod member 108 constitutes a "second position adjusting member".

The third arm member 110 is fixedly supported to the cover member 400, with two insertion shafts 115 extending along the vehicle body right/left direction being inserted into respective first insertion holes 402 defined in the cover member 400. The first cylindrical member 111 is supported to be rotatable relative to the third arm member 110 about an axis extending along the vehicle body fore/aft direction. With this, when the second arm member 109 is pivoted, the first cylindrical member 111 is rotated about the axis along the vehicle body fore/aft direction and the fourth arm member 112 too is pivoted about the axis along the vehicle body fore/aft direction.

The second coupling member 114 is fixedly supported to the movable shaft 101. The second coupling member 114 has an angular hook shape in the plane view with two wall portions 114a spaced apart from each other along the vehicle body right/left direction. As described above, in association with a pivotal movement of the second arm member 109, the first cylindrical member 111 is rotated about the axis along the vehicle body fore/aft direction, and the fourth arm member 112 is pivoted about the axis extending along the vehicle body fore/aft direction, whereby the second coupling member 113 is moved along the vehicle body right/left direction. With this, the second coupling member 114 has its wall portions 114a pushed along the vehicle body right/left direction by the second coupling pin member 113, thus being slid along the vehicle body right/left direction.

When the main speed changer lever 300 is pivoted about the axis Y1 extending along the vehicle body fore/aft direction, this motion of the main speed changer lever 300 is transmitted via the first extension member 107, the second rod member 108, the second arm member 109, the first cylindrical member 111 and the fourth arm member 112 to move the second coupling pin member 113 along the vehicle body right/left direction. And, as the second coupling pin member 113 pushes the wall portions 114a of the second coupling member 114 along the vehicle body right/left direction, the second coupling member 114 is slid along the vehicle body right/left direction and the movable shaft 101 is slid along the vehicle body right/left direction.

In the above, regarding the coupling between the second motion converting mechanism 103 and the movable shaft 101, since the second coupling member 113 is disposed between the pair of wall portions 114a of the second coupling member 114, the second coupling member 114 is coupled to the second coupling pin member 113 with the second coupling member 113 be vertically slidable. With the above, when the movable shaft 101 is rotated about the axis Z1 extending along the vehicle body right/left direction through the conversion by the first motion converting mechanism 102, the second coupling pin member 113 is moved between the pair of wall portions 114a of the second coupling member 114, thus allowing the rotation of the movable shaft 101 about the axis Z1. In this way, a coupling mechanism for allowing movement of the movable shaft 101 converted by the first motion converting mechanism 102 is provided in the second motion converting mechanism 103 and this coupling mechanism consists essentially of the second coupling pin member 113 and the second coupling member 114.

In this second alternative embodiment, modifications are made also in the second link mechanism as compared with the foregoing embodiment. Therefore, this second link mechanism 200 will be explained next.

The second link mechanism 200, like the foregoing embodiment, is provided for enabling coupling and release of coupling between the main speed changer lever 300 and the parking brake mechanism 17. The second link mechanism 200, as shown in FIG. 21, includes the first coupling member 106 included also in the first motion converting mechanism 102, a first pivotal member 201 pivotable about the axis extending along the vehicle right/left direction, an elongate slot 202 defined in the first coupling member 106 and a first pin member 203 provided in the first pivotal member 201.

The first pivotal member 201 is supported to the cover member 400 to be pivotable about the axis extending along the vehicle body right/left direction, with an insertion shaft 204 provided at one end thereof being inserted into a second insertion hole 403 defined in the cover member 400. As shown in FIG. 18, when the main speed changer lever 300 is located in the neutral path 81 and the speed changing paths 80 in FIG. 12, the first pin member 203 is separated from the first coupling member 106 and the first pin member 203 is away from the elongate slot 202, whereby the operative coupling between the main speed changer lever 300 and the parking brake mechanism 17 is released.

Then, as shown in FIG. 19, the main speed changer lever 300 will be pivoted about the axis Y1 along the vehicle body fore/aft direction thereby to bring the main speed changer lever 300 into the braking path 83 in FIG. 12. This movement of the main speed changer lever 300 is converted into a sliding movement along the vehicle body right/left direction by the second motion converting mechanism 103. With this, the first coupling member 106 fixedly supported to the movable shaft 101 is slid toward the vehicle body inner side along the vehicle body right/left direction and the first pin member 303 enters the elongate slot 202, whereby operative coupling is established between the main speed changer lever 300 and the parking brake mechanism 17.

Under the establishment of operative coupling between the main speed changer lever 300 and the parking brake mechanism 17, the main speed changer lever 300 is pivoted about the axis X1 extending along the vehicle body right/left direction and the main speed changer lever 300 is moved along the braking path 83 in FIG. 12. This movement of the main speed changer lever 300 is transmitted to and converted by the first motion converting mechanism 102 to pivot the first coupling member 106 about the axis extending along the vehicle body right/left direction; and in association with this movement of the first coupling member 106, the first pivotal member 201 too is pivoted about the axis extending along the vehicle body right/left direction. As shown in FIG. 17, the first pivotal member 201 is coupled to the rod member 75 provided in the foregoing embodiment. In operation, as the rod member 75 is pivoted vertically by a pivotal movement of the first pivotal member 201, the movement of the first pivotal member 201 and the movement of the first member 61 of the parking brake mechanism 17 are operably coupled with each other. And, as the first member 61 of the parking brake mechanism 17 is pivoted by the pivotal movement of the first pivotal member 201, the parking brake mechanism 17 is actuated for applying parking brake.

In this second alternative embodiment, modifications are made also in a locking mechanism 500 as compared with the foregoing embodiment. Therefore, this locking mechanism 500 will be explained next.

Figure 22:
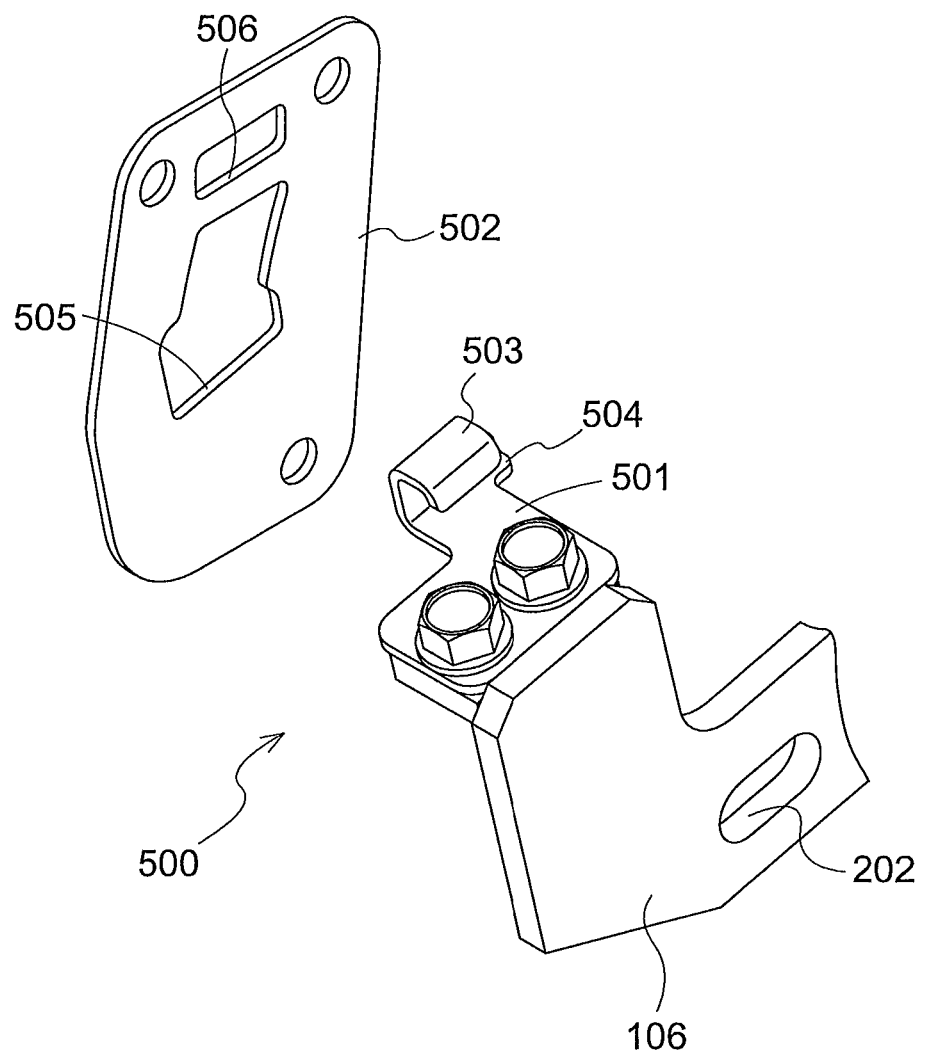
FIG. 22 is an exploded perspective view of a locking mechanism.

The locking mechanism 500, as shown in FIG. 21 and FIG. 22, includes a retaining member 501 (corresponding to a "retaining portion") coupled to a component included in the main speed changer lever 300 and a retained member (corresponding to a "retained portion") fixed to the cover member 400. The retaining member 501 is provided to extend from the first coupling member 106 toward the vehicle body inner side along the vehicle body right/left direction. In the retaining member 601, its leading end portion 503 is formed in a hook shape as being folded upward and then folded toward the vehicle body outer side in the vehicle body right/left direction. Further, at the leading end portion 603 of the retaining member 501, there is provided a projecting portion 504 which projects to the forward side in the vehicle body fore/aft direction. The retained member 502 defines a first opening portion 505 in/from which the leading end portion 501a of the retaining member 501 can be inserted/withdrawn and a second opening portion 506 formed upwardly of the first opening portion 505. The first opening portion 505 is formed to extend from its lower end portion toward the rearward obliquely upward side and then toward the obliquely upward side on the forward side in the vehicle body fore/aft direction. The second opening portion 506 has a narrow elongate shape elongate in the vehicle body fore/aft direction.

Next, movements of the locking mechanism 500 associated with movements of the main speed changer lever 300 will be explained.

As shown in FIG. 19, the main speed changer lever 300 is pivoted about the axis Y1 extending along the vehicle body fore/aft direction so that the main speed changer lever 300 is located in the braking path 83 in FIG. 12. This movement of the main speed changer lever 300 is converted by the second motion converting mechanism 103 into a sliding movement of the movable shaft 101 along the vehicle body right/left direction, so that the movable shaft 101 is slid toward the vehicle body inner side in the vehicle body right/left direction. With this, the first coupling member 106 fixedly supported to the movable shaft 101 is slid toward the vehicle body inner side along the vehicle body right/left direction, and the leading end portion 503 of the retaining member 501 is inserted into the first opening portion 505.

And, as the main speed changer lever 300 is pivoted about the axis X1 extending along the vehicle body right/left direction, the main speed changer lever 300 is moved along the braking path 83 in FIG. 12. With this, the leading end portion 503 of the retaining member 501, as being kept inserted in the first opening portion 505, is moved upward inside this first opening portion 505. Next, as the main speed changer lever 300 is pivoted about the axis Y1 extending along the vehicle body fore/aft direction, the main speed changer lever 300 is moved along the first locking path 84 in FIG. 12. With this, the first coupling member 106 is slid toward the vehicle body outer side along the vehicle body right/left direction and the hook-like portion of the leading end portion 503 of the retaining member 501 is inserted into the second opening portion 506. Next, as the main speed changer lever 300 is pivoted about the axis X1 along the vehicle body right/left direction, the main speed changer lever 300 is moved along the second locking path 85 in FIG. 12. With this, the projecting portion 604 of the leading end portion 503 of the retaining member 501 comes into contact with the face of the retained member 502 in opposition to the vehicle body inner side to be retained thereby. With this, the position of the main speed changer lever 300 is locked, so that the parking brake mechanism 17 is maintained under its parking brake applying state.

[Other Alternative Embodiments]

(1) The operation paths of the main speed changer lever 19A are not limited to those shown in FIG. 12. For example, in case the main speed changer device 6 is an HST (hydrostatic stepless speed changer), like the foregoing embodiment, the linking path 82 may be provided on an extension from the neutral path 81. In case e.g. the speed changing paths 80 are formed as a single straight path and the neutral path 81 is formed as a point, the linking path 82 may be extended from this neutral point in the direction to intersect the speed changing path 80.

(2) In the foregoing embodiment, the neutral path 81 and the speed changing paths 80 are "perpendicular to each other" and the speed changing paths 80 and the linking path 82 are "perpendicular (90 degrees intersection) to each other". These arrangements need not be "perpendicular" but may be at least "intersecting each other".

(3) The main speed changer device 6 is not limited to the one capable of changing speed in six speeds. Instead, the device 6 may be configured to change speed in five or fewer speeds or seven or more speeds.

(4) In the foregoing embodiment, there was provided the cover member 40 which is detachable from the transmission case MC and the right side of the transmission case MC is configured to be open to the outside. However, the invention is not limited thereto. The right side of the transmission case MC can be configured not to be openable to the outside, without providing the cover member 40.

(5) In the first alternative embodiment described above, there was disclosed an example wherein the auxiliary speed changer mechanism is attachable after the assembly. However, the invention is not limited thereto. Instead, the creep mechanism 90 may be provided from the beginning.

(6) The main speed changer lever 19A and the auxiliary speed changer lever 19B can be arranged on either side of the left and right sides relative to the driver's seat DS.

(7) In the foregoing embodiment, there was disclosed an example wherein the hook-like member 52 is attached to an end of the operation shaft 44 via the support member 50 and the attaching member 51. The invention is not limited thereto. For instance, though not shown in particular, the hook-like member 52 can be directly supported to the main speed changer lever 19A. Further, the locking mechanism 18 is not limited the configuration including the hook-like member 52 and the receiving member 53 described in the foregoing embodiment. The locking mechanism can be of any configuration as long as it is capable of locking the position of the main speed changer lever 19A or the operation shaft 44.

(8) In the foregoing embodiment, the receiving member 53 is supported to the transmission case MC via the bracket 42. The invention is not limited thereto. The receiving member 53 can be fixed to any other member as long as such other member remains stationary relative to the operation shaft 44 and the main speed changer lever 19A.

(9) The parking brake mechanism 17 need not be meshed with the output gear 9a. Instead, the mechanism 17 can be meshed with any other gear as long as it is capable of restricting movement of the transmission mechanism TM. Further, the parking brake mechanism 17 need not be meshed with any gear at all, but can be a friction-plate type construction.

(10) In the above second alternative embodiment, for providing the second coupling pin member 113 and the second coupling member 114 as the coupling mechanism, one of the first motion converting mechanism 102 and the second motion converting mechanism 103 is used as the first motion converting mechanism 102, and the other one of the first motion converting mechanism 102 and the second motion converting mechanism 103 is used as the second motion converting mechanism 103 and the second motion converting mechanism 103 is provided with the second coupling pin member 113 and the second coupling member 114. Instead, for example, the first motion converting member may be provided with the coupling mechanism by a coupling member having a pair of wall portions extending along the vehicle body right/left direction and a coupling pin member disposed between these wall portions for operative coupling between the coupling member and the coupling pin member.

(11) In the foregoing second alternative embodiment, for providing the second coupling pin member 113 and the second coupling member 114 as the coupling mechanism, the second coupling pin member 113 is provided in the motion converting mechanism side of the first motion converting mechanism 102 or the second motion converting mechanism 103 and the second coupling member 114 is provided on the side of the movable shaft 101. Conversely, the coupling member may be provided on the side of the motion converting mechanism of the first motion converting mechanism 102 or the second motion converting mechanism 103 and the coupling pin member may be provided on the side of the movable shaft 101.

The application of the present invention is not limited to the four wheel drive tractor having no cabin. The invention is applicable also to a tractor having a cabin or a tractor having a crawler type traveling device instead of rear wheels or to any other work vehicle.

What is claimed is:

1. A work vehicle comprising:
an engine;
a transmission mechanism for transmitting a rotational drive power of the engine to a traveling device;
a speed changer device provided in the transmission mechanism and capable of changing vehicle speed by speed-changing the rotational drive power;
a parking brake mechanism capable of restricting operation of the transmission mechanism;
a single operation lever that is manually pivotable and capable of speed changing operations of the speed changer device and a braking operation of the parking brake device;
a first link mechanism for linking the operation lever with the speed changer device;
a second link mechanism capable of linking and release of linking between the operation lever and the parking brake mechanism;
a locking mechanism capable of maintaining the parking brake device under a condition of restricting operation of the operation lever through restriction of position of the operation lever;

wherein the operation lever includes, as speed changing operation paths thereof, a neutral path corresponding to a neutral state of the speed changer device and a speed changing path extending straight from the neutral path and corresponding to a speed changing state of the speed changer device;

the braking operation is effected only by a pivotal operation of the operation lever;

the operation lever includes, as brake operating paths thereof, a linking path extending from the neutral path along a direction intersecting the speed changing path, a braking path extending from a terminal end of the linking path along a direction intersecting the linking path, and a locking path extending at least from a terminal end of the braking path along a direction intersecting the braking path;

when the operation lever is operated either to the speed changing path or the neutral path, the second link mechanism does not link the operation lever with the parking brake mechanism;

when the operation lever is operated from the neutral path to the linking path, the second link mechanism links the operation lever with the parking brake mechanism;

when the operation lever is operated to the braking path, the parking brake mechanism is actuated; and when the operation lever is operated to the locking path, the locking mechanism is actuated.

2. A work vehicle comprising:

an engine;

a transmission mechanism for transmitting a rotational drive power of the engine to a traveling device;

a speed changer device provided in the transmission mechanism and capable of changing vehicle speed by speed-changing the rotational drive power;

a parking brake mechanism capable of restricting operation of the transmission mechanism;

a single operation lever that is manually pivotable and capable of speed changing operations of the speed changer device and a braking operation of the parking brake device;

a first link mechanism for linking the operation lever with the speed changer device;

a second link mechanism capable of linking and release of linking between the operation lever and the parking brake mechanism;

a locking mechanism capable of maintaining the parking brake device under a condition of restricting operation of the operation lever through restriction of position of the operation lever;

wherein the operation lever includes, as speed changing operation paths thereof, a neutral path corresponding to a neutral state of the speed changer device and a speed changing path extending straight from the neutral path and corresponding to a speed changing state of the speed changer device;

the braking operation is effected on by a pivotal operation of the operation lever;

the operation lever includes, as brake operating paths thereof, a linking path extending from the neutral path along a direction intersecting the speed changing path, a braking path extending from a terminal end of the linking path along a direction intersecting the linking path, and a locking path extending at least from a terminal end of the braking path along a direction intersecting the braking path;

when the operation lever is operated either to the speed changing path or the neutral path, the second link mechanism does not link the operation lever with the parking brake mechanism;

when the operation lever is operated from the neutral path to the linking path, the second link mechanism links the operation lever with the parking brake mechanism;

when the operation lever is operated to the braking path, the parking brake mechanism is actuated;

when the operation lever is operated to the locking path, the locking mechanism is actuated; and wherein:

the locking mechanism includes a retaining portion connected to a component included in the operation lever and a retained portion fixed to a component which remains stationary relative to the operation lever; and when the operation lever is operated to the locking path, the retaining portion is retained to the retained portion.

3. A work vehicle comprising:

an engine;

a transmission mechanism for transmitting a rotational drive power of the engine to a traveling device;

a speed changer device provided in the transmission mechanism and capable of changing vehicle speed by speed-changing the rotational drive power;

a parking brake mechanism capable of restricting operation of the transmission mechanism;

a single operation lever that is manually pivotable and capable of speed changing operations of the speed changer device and a braking operation of the parking brake device;

a first link mechanism for linking the operation lever with the speed changer device;

a second link mechanism capable of linking and release of linking between the operation lever and the parking brake mechanism;

a locking mechanism capable of maintaining the parking brake device under a condition of restricting operation of the operation lever through restriction of position of the operation lever;

wherein the operation lever includes, as speed changing operation paths thereof, a neutral path corresponding to a neutral state of the speed changer device and a speed changing path extending straight from the neutral state of path and corresponding to a speed changing state of the speed changer device;

the braking operation is effected only by a pivotal operation of the operation lever;

the operation lever includes, as brake operating paths thereof, a linking path extending from the neutral path along a direction intersecting the speed changing path, a braking path extending from a terminal end of the linking path along a direction intersecting the linking path, and a locking path extending at least from a terminal end of the braking path along a direction intersecting the braking path;

when the operation lever is operated either to the speed changing path or the neutral path, the second link mechanism does not link the operation lever with the parking brake mechanism;

when the operation lever is operated from the neutral path to the linking path, the second link mechanism links the operation lever with the parking brake mechanism;

when the operation lever is operated to the braking path, the parking brake mechanism is actuated;

when the operation lever is operated to the locking path, the locking mechanism is actuated; and wherein:

the locking path includes a first locking path extending from the terminal end of the braking path along the direction intersecting the braking path and extending toward the neutral path and a second locking path extending from a terminal end of the first locking path along a direction intersecting the first locking path and extending toward the neutral path.

4. The work vehicle according to claim 3, wherein:
the locking mechanism includes a retaining portion connected to a component included in the operation lever and a retained portion fixed to a component which is stationary relative to the operation lever;
when the operation lever is operated into the locking path, the retaining portion becomes retained to the retained portion; and
the retained portion includes a first opening portion which the retaining portion can enter and a projecting portion adjacent the first opening portion, and the retaining portion includes a second opening portion which the projecting portion can enter; and
when the operation lever is operated to the speed changing path or the neutral path, the retaining portion and the retained portion are separated from each other;
when the operation lever is operated from the neutral path to the terminal end of the linking path, the retaining portion and the retained portion move closer to each other;
when the operation lever is operated from the terminal end of the linking path to the terminal end of the braking path, the retaining portion enters the first opening portion and the second opening portion is brought into opposition to the projecting portion;
when the operation lever is operated from terminal end of the braking path to the terminal end of the first locking path, the projecting portion enters the second opening portion; and
when the operation lever is operated from the terminal end of the first locking path to a terminal end of the second locking path, the projecting portion is retained to the edge of the second opening portion.

5. A work vehicle comprising:
an engine
a transmission mechanism for transmitting a rotational drive power of the engine to a traveling device;
a speed changer device provided in the transmission mechanism and capable of changing vehicle speed by speed-changing the rotational drive power;
a parking brake mechanism capable of restricting operation of the transmission mechanism;
a single operation lever that is manually pivotable and capable of speed changing operations of the speed changer device and a braking operation of the parking brake device;
a first link mechanism for linking the operation lever with the speed changer device;
a second link mechanism capable of linking and release of linking between the operation lever and the parking brake mechanism;
a locking mechanism capable of maintaining the parking brake device under a condition of restricting operation of the operation lever through restriction of position of the operation lever;
wherein the operation lever includes, as speed changing operation paths thereof, a neutral path corresponding to a neutral state of the speed changer device and a speed changing path extending straight from the neutral path and corresponding to a speed changing state of the speed changer device;
the braking operation is effected only by a pivotal operation of the operation lever;
the operation lever includes, as brake operating paths thereof, a linking path extending from the neutral path along a direction intersecting the speed changing path a braking path extending from a terminal end of the linking path along a direction intersecting the linking path and a locking path extending at least from a terminal end of the braking path along a direction intersecting the braking path;
when the operation lever is operated either to the speed changing path or the neutral path, the second link mechanism does not link the operation lever with the parking brake mechanism;
when the operation lever is operated from the neutral path to the linking path, the second link mechanism links the operation lever with the parking brake mechanism;
when the operation lever is operated to the braking path, the parking brake mechanism is actuated;
when the operation lever is operated to the locking path, the locking mechanism is actuated; and wherein:
the first link mechanism includes a movable shaft supported to be movable to a plurality of speed positions, a first motion converting mechanism for converting a pivotal operation of the operation lever along a vehicle right/left direction into a motion of the movable shaft along a first direction, and a second motion converting mechanism for converting a pivotal operation of the operation lever along a vehicle body fore/aft direction into a motion of the movable shaft along a second direction;
the first motion converting mechanism includes a first position adjusting member capable of adjusting the relative position between the operation lever and the movable shaft in the vehicle body fore/aft direction; and
the second motion converting mechanism includes a second position adjusting member capable of adjusting the relative position between the operation lever and the movable shaft in the vehicle body right/left direction.

6. The work vehicle according to claim 5, wherein:
one of the first motion converting mechanism and the second motion converting mechanism includes a coupling mechanism for coupling to the movable shaft; and
the coupling mechanism allows the motion of the movable shaft converted by the other one of the first motion converting mechanism and the second motion converting mechanism.

7. The work vehicle according to claim 6, wherein:
the coupling mechanism includes a coupling pin member and a coupling member; and
the coupling member includes a pair of wall portions extending in the first direction and the second direction and spaced apart from each other and the coupling member is coupled to the coupling pin member with the coupling pin member being disposed between the pair of wall portions.

8. A work vehicle comprising:
an engine;
a transmission mechanism for transmitting a rotational drive power of the engine to a traveling device;
a speed changer device provided in the transmission mechanism and capable of changing vehicle speed by speed-changing the rotational drive power;

a parking brake mechanism capable of restricting operation of the transmission mechanism;

a single operation lever that is manually pivotable and capable of speed changing operations of the speed changer device and a braking operation of the parking brake device;

a first link mechanism for linking the operation lever with the speed changer device;

a second link mechanism capable of linking and release of linking between the operation lever and the parking brake mechanism;

a locking mechanism ca able of maintaining the parking brake device under a condition of restricting operation of the operation lever through restriction of position of the operation lever;

wherein the operation lever includes, as speed changing operation paths thereof, a neutral path corresponding to a neutral state of the speed changer device and a speed changing path extending straight from the neutral path and corresponding to a speed changing state of the speed changer device;

the braking operation is effected only by a pivotal operation of the operation lever;

the operation lever includes, as brake operating paths thereof, a linking path extending from the neutral path along direction intersecting the speed changing path, a braking path extending from a terminal end of the linking path along a direction intersecting the linking path, and a locking path extending at least from a terminal end of the braking path along a direction intersecting the braking path;

when the operation lever is operated either to the speed changing path or the neutral path, the second link mechanism does not link the operation lever with the parking brake mechanism;

when the operation lever is operated from the neutral path to the linking path, the second link mechanism links the operation lever with the parking brake mechanism;

when the operation lever is operated to the braking path, the parking brake mechanism is actuated;

when the operation lever is operated to the locking path, the locking mechanism is actuated; and wherein:

there are provided a projecting portion disposed in one of a component included in the operation lever and a component included in the second link mechanism and a hole portion disposed in the other of the component included in the operation lever and the component included in the second link mechanism, the projecting portion being capable of entering the hole portion; and when the projecting portion enters the hole portion, the operation lever and the parking brake mechanism are linked to each other via the second link mechanism.

9. The work vehicle according to claim 8, wherein:

the projecting portion projects in the direction along the linking path; and the length of the projecting portion is shorter than the amount of movement of the hole portion when the operation lever is operated along the linking path and the length is longer than the amount of movement of the hole portion in the direction along the linking path when the operation lever is operated along the braking path and the locking path.

10. The work vehicle according to claim 8, wherein:

the locking mechanism includes a retaining portion connected to a component included in the operation lever and a retained portion fixed to a component which remains stationary relative to the operation lever;

when the operation lever is operated to the locking path, the retaining portion is retained to the retained portion; and the retained portion and one of the projecting portion and the hole portion are supported by a bracket that pivotally supports the operation lever.

\* \* \* \* \*

UNITED STATES PATENT AND TRADEMARK OFFICE
CERTIFICATE OF CORRECTION

PATENT NO. : 8,763,748 B2  Page 1 of 1
APPLICATION NO. : 13/599280
DATED : July 1, 2014
INVENTOR(S) : Tsuji It is certified that error appears in the above-identified patent and that said Letters Patent is hereby corrected as shown below:

In the Claims

Column 29, Line 58, Claim 2, delete "on" and insert -- only --

Column 30, Lines 44-45, Claim 3, after "neutral" delete "state of"

Column 31, Line 44, Claim 5, delete "engine" and insert -- engine; --

Column 32, Line 8, Claim 5, delete "path" and insert -- path, --

Column 32, Line 11, Claim 5, delete "path" and insert -- path, --

Column 33, Line 12, Claim 8, delete "ca able" and insert -- capable --

Column 33, Line 26, Claim 8, after "along" insert -- a --

Signed and Sealed this
Seventh Day of October, 2014

Michelle K. Lee
*Deputy Director of the United States Patent and Trademark Office*